(12) United States Patent
Virgili et al.

(10) Patent No.: US 10,592,018 B2
(45) Date of Patent: Mar. 17, 2020

(54) ELASTOMER TIE LAYER AND METHODS

(71) Applicant: Tactus Technology, Inc., Fremont, CA (US)

(72) Inventors: Justin Virgili, Fremont, CA (US); Micah Yairi, Fremont, CA (US); Brian Flamm, Fremont, CA (US)

(73) Assignee: Tactus Technology, Inc., Fremont, CA (US)

( * ) Notice: Subject to any disclaimer, the term of this patent is extended or adjusted under 35 U.S.C. 154(b) by 0 days.

(21) Appl. No.: 15/921,557

(22) Filed: Mar. 14, 2018

(65) Prior Publication Data

US 2018/0267640 A1 Sep. 20, 2018

Related U.S. Application Data

(60) Provisional application No. 62/471,258, filed on Mar. 14, 2017.

(51) Int. Cl.
*G06F 3/041* (2006.01)
*B32B 7/12* (2006.01)
(Continued)

(52) U.S. Cl.
CPC .............. *G06F 3/041* (2013.01); *B32B 3/26* (2013.01); *B32B 7/12* (2013.01); *B32B 27/06* (2013.01); *G06F 3/016* (2013.01); *B32B 2255/10* (2013.01); *B32B 2255/26* (2013.01); *B32B 2307/412* (2013.01); *B32B 2307/42* (2013.01); *B32B 2307/51* (2013.01); *B32B 2375/00* (2013.01); *B32B 2457/208* (2013.01); *G06F 2203/04102* (2013.01); *G06F 2203/04103* (2013.01)

(58) Field of Classification Search
CPC ..................... G06F 3/041; G06F 3/016; G06F 2203/04102; G06F 2203/04103; B32B 27/06; B32B 3/26; B32B 7/12; B32B 2375/00; B32B 2307/42; B32B 2255/26; B32B 2307/51; B32B 2255/10; B32B 2457/208; B32B 2307/412
See application file for complete search history.

(56) References Cited

U.S. PATENT DOCUMENTS

| 2009/0174687 A1* | 7/2009 | Ciesla | G06F 3/04886 345/174 |
| 2013/0076649 A1* | 3/2013 | Myers | H04M 1/0268 345/173 |

(Continued)

*Primary Examiner* — Premal R Patel
(74) *Attorney, Agent, or Firm* — Run8 Patent Group, LLC; Peter Miller

(57) ABSTRACT

One variation of tactile interface includes: a flexible substrate configured to deform to a first offset in response to application of a deflecting force on the flexible substrate; a tactile layer defining a tactile surface and configured to deform to a second offset in response to application of the deflecting force on the tactile surface; and a tie layer configured to retain the tactile layer against the substrate, the tie layer defining a first surface contacting the flexible substrate and a second surface contacting the tactile layer, the first surface of the tie layer configured to stretch by the first offset to maintain contact with the substrate and the second surface of the tie layer configured to stretch by the second offset to maintain contact with the tactile layer.

18 Claims, 19 Drawing Sheets

(51) Int. Cl.
*B32B 3/26* (2006.01)
*B32B 27/06* (2006.01)
*G06F 3/01* (2006.01)

(56) References Cited

U.S. PATENT DOCUMENTS

| | | | |
|---|---|---|---|
| 2015/0070903 A1* | 3/2015 | Min | G02B 5/0268 362/311.06 |
| 2015/0293591 A1* | 10/2015 | Yairi | G06F 3/0416 345/173 |
| 2016/0103505 A1* | 4/2016 | Fukumoto | G06F 3/0338 345/161 |
| 2017/0200915 A1* | 7/2017 | Lee | G02B 5/3033 |
| 2018/0230258 A1* | 8/2018 | Virgili | C08G 18/10 |

\* cited by examiner

ELASTOMER TIE LAYER AND METHODS

CROSS-REFERENCE TO RELATED APPLICATIONS

This Application claims the benefit of U.S. Provisional Application No. 62/471,258, filed on 14 Mar. 2017, which is incorporated in its entirety by this reference.

This application is related to U.S. patent application Ser. No. 14/035,851, filed 24 Sep. 2013; U.S. patent application Ser. No. 12/652,704, filed on 5 Jan. 2010; U.S. patent application Ser. No. 13/465,772, filed on 7 May 2012; and U.S. patent application Ser. No. 14/495,709, filed on 24 Sep. 2014, all of which are incorporated in their entireties by this reference.

TECHNICAL FIELD

This invention relates generally to the field of touch-sensitive displays, and more specifically to a deformable tactile interface and methods for assembling layers of the tactile interface.

DESCRIPTION OF THE EMBODIMENTS

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. Tactile Interface

Figure 1:
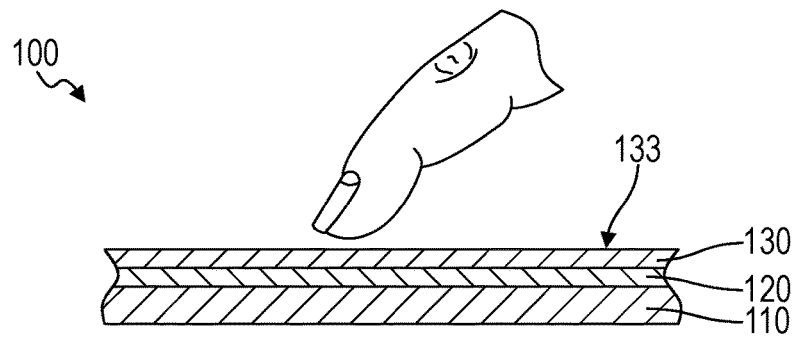
FIG. 1 is a schematic representation of a tactile interface.

As shown in FIG. 1, a tactile interface includes a substrate, a tie layer coupled to the substrate, and a tactile layer coupled to the tie layer opposite the substrate and defining a tactile surface. One variation of tactile interface includes: a flexible substrate configured to deform to a first offset in response to application of a deflecting force on the flexible substrate; a tactile layer defining a tactile surface and configured to deform to a second offset in response to application of the deflecting force on the tactile surface; and a tie layer configured to retain the tactile layer against the substrate, the tie layer defining a first surface contacting the flexible substrate and a second surface contacting the tactile layer, the first surface of the tie layer configured to stretch by the first offset to maintain contact with the substrate and the second surface of the tie layer configured to stretch by the second offset to maintain contact with the tactile layer.

Figure 4:
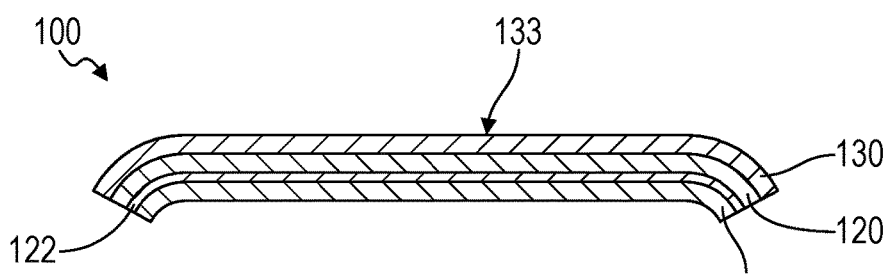
FIG. 4 is a schematic representation of a variation of the tactile interface.
Figure 6A:
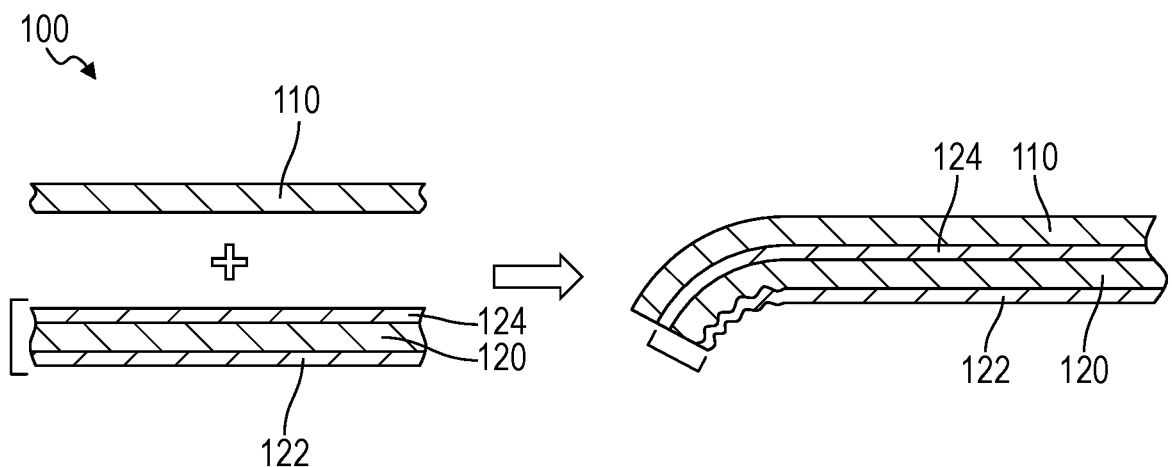
FIGS. 6A and 6B are flowchart representations of a variation of the tactile interface.
Figure 6B:
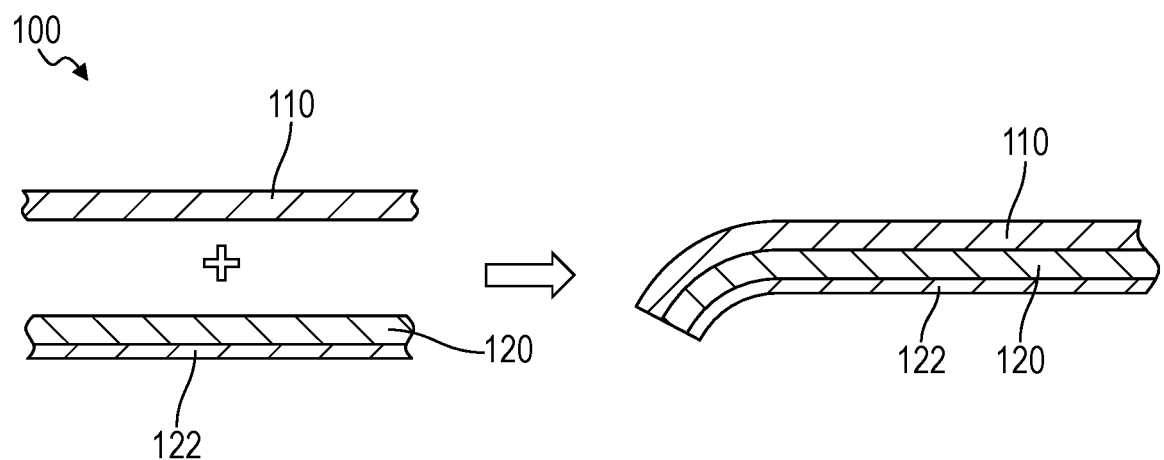

Another variation of the tactile interface shown in FIGS. 4, 6A, and 6B includes: a substrate; a first tie layer arranged over the substrate and configured to adhere to the substrate; and a tactile layer defining a tactile surface comprising a planar portion and a non-planar portion proximal an edge of the tactile layer, the first tie layer configured to adhere the tactile layer to the substrate across the planar portion and proximal the non-planar edge.

2. Applications

Generally, the tactile interface can be applied over a display, a touch-sensitive surface, and/or another surface of a computing device, such as a phone or tablet. For example, the tactile interface can replace cover glass over a display of the computing device. The tactile interface can be configured to: protect surfaces of the computing device from impacts; and maintain adhesion between layers of the tactile interface and particular optical properties (e.g., optical clarity) in response to deformation of the tactile layer. Generally, the tactile interface can include multiple layers adhered together by an elastomeric tie layer, each layer in the tactile interface cooperating to resist and recover from impacts to the tactile interface, maintain optical clarity, and maintain bonding between the layers of the tactile interface when shear, compressive, and/or tensile stresses are applied to the tactile interface.

In particular, the tactile interface includes a substrate, a tactile layer that defines a tactile surface onto which a user may apply inputs, and a tie layer between the substrate and the tactile (e.g., elastomer) layer configured to retain the tactile layer against the substrate. The substrate 110, the tie layer 120 (e.g., the silicon oxide film), the tactile layer 130, and/or other components of the tactile interface 100 can also be of similar indices of refraction (e.g., at an average wavelength of light in the visible spectrum) or can share similar chromatic dispersion or other optical properties.

Figure 3:
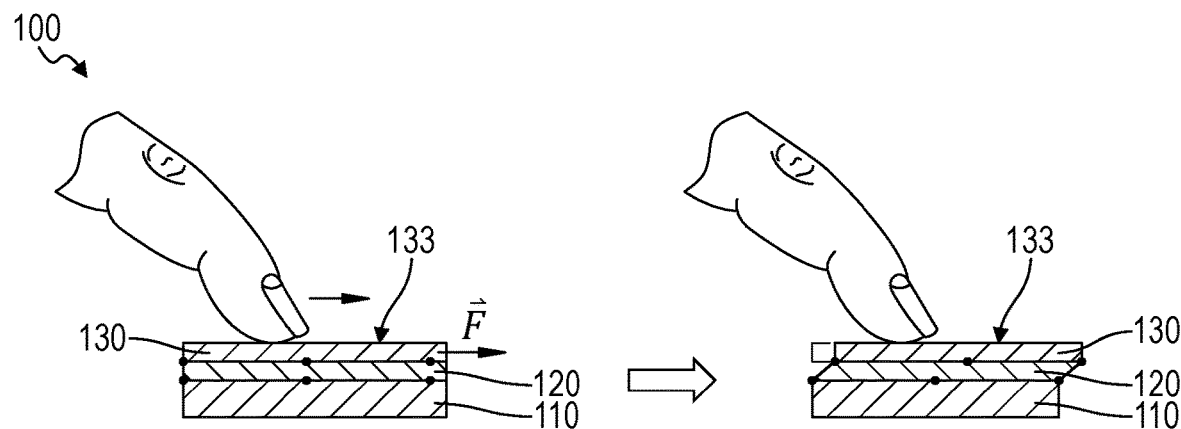
FIG. 3 is a flowchart representation of a variation of the tactile interface.

The tie layer can be elastomeric and can be applied between other layers of the tactile interface to adhere layers of the tactile interface together. In one implementation, the tie layer can adhere the tactile (e.g., urethane) layer to a rigid (e.g., PET) substrate. The tie layer can, therefore, replace adhesives—such as an optically clear adhesive (hereinafter "OCA")—deposited between layers of the tactile interface. The tie layer functions to secure the tactile layer to the substrate in order to resist separation of the tactile layer from the substrate layer(s) in response deformation and/or other shear, compressive, and tensile stresses across the tactile interface, such as due to bending or folding of the tactile interface applied over a flexible display. The tie layer can exhibit elastic properties and can, therefore, stretch in response to forces applied to the tactile interface. For example, in response to a shear force applied to the tactile surface shifting the center of mass of the tactile layer in a first direction while the substrate layer is retained in a static position, the tie layer can stretch laterally such that a boundary of the tie layer adjacent the tactile layer moves with the tactile layer and a boundary of the tie layer adjacent the substrate remains static against the—stationary—substrate as shown in FIG. 3. Some adhesives can fail or fatigue under shear forces due to inadequate cross-linking or bonding between the adhesive and adjacent layers and/or rigidity of the adhesive layer in shear. However, the tie layer can elastically stretch to adapt to shear stresses. The tie layer can also cooperate with the substrate and the tactile layer to communicate light (e.g., transmit light) across the tactile interface and, thus, can exhibit substantial transparent and/or translucent properties.

By directly casting the tie layer onto the substrate with a solvent, the tactile interface can exhibit optical clarity (e.g., high transmission, low haze, etc.), high adhesion to the substrate, and high elasticity due to chemical and physical cross-linking between polymers of the tie layer. Rather than melting and casting (or extruding) a polymer with chemical and physical cross-links formed prior to casting, the tie layer can be cast from a prepolymer to improve physical cross-links between polymer chains (and the overall tactile layer) after casting and, thereby improving mechanical properties (e.g., durability) of the tactile layer 100 after casting. As described above, by casting the tie layer directly onto the tactile layer and/or the substrate, the tie layer can elastically stretch to adapt to shear stresses (and other deformation of the tie layer) due to cross-linking between the tie layer and adjacent layers (e.g., the tactile layer). Therefore, the tie layer can cooperate with adjacent layers to limit formation of optical aberrations resulting from separation of the tie layer from adjacent layers and/or fatigue of the tie layer in response to repeated deformation.

3. Substrate

The substrate 110 can be substantially planar and rigid and can, therefore, retain the tactile layer 130 in substantially planar form. However, the substrate 110 can be of any other form, such as curvilinear, convex, or concave. Additionally or alternatively, the substrate 110 can be flexible.

The substrate can include an optically clear, translucent, or transparent material. For example, the substrate 110 can include a layer of acrylic (i.e., poly(methyl methacrylate) or "PMMA") or any other substantially translucent and/or transparent material.

In one implementation, the substrate 110 can be surface-treated or chemically-altered PMMA, glass, chemically-strengthened alkali-aluminosilicate glass, polycarbonate, acrylic, polyvinyl chloride (PVC), polyester (PET), urethane, a silicone-based elastomer, epoxy, polyamides, or any other suitable transparent (and optically clear) material or combination thereof. Furthermore, the substrate can include any combination of materials and can be reinforced with fillers, such as glass or carbon fibers. Alternatively, the substrate 110 can be opaque, such as for arrangement over an off-screen region of a mobile computing device.

In another implementation, the substrate 110 can also be of a material exhibiting adhesion properties configured to bond with the tie layer such that the tie layer 120, deposited onto the attachment surface 116, can function to retain the tactile layer against the substrate in response to deformation of the tactile interface. For example, surface treatments to the tie layer and/or the substrate can increase adhesion between the tie layer and the substrate and between the tie layer and the tactile layer.

The substrate can also include (e.g., be embedded with or coated with) stabilizers, such as UV, hydrolytic, and/or thermo-oxidative stabilizers. The stabilizers can include UV stabilizers, such as benzophenones, benzotriazoles, hindered amine light stabilizers (HALS), or hydroxyphenyl-benzotriazoles, which absorb UV radiation and prevent formation of free radicals within plastics, thereby resisting discoloration of the tactile interface in response to exposure to UV light. The stabilizers can also include hydrolytic stabilizers for urethanes and thermoplastic polyurethanes (TPU), such as carbodiamide-based stabilizers, to limit surface reaction with the substrate, the tie layer, and the tactile layer and limit delamination of discoloration of the layers. The stabilizers can also include thermo-oxidative stabilizers, such as butylated hydroxytoluene (BHT) and hindered phenols, to resist delamination of the substrate from the tie layer and the tactile layer. The substrate can also include an antimicrobial additive, such as silver, copper, or zinc nanoparticles.

The tactile interface 100 can also include multiple layers of the substrate, each layer as shown and described in U.S. patent application Ser. No. 12/652,704, which is incorporated in its entirety by this reference. Each layer of the substrate can be stacked and can be adhered (or bonded) together according to any of the foregoing or forthcoming methods or techniques.

4. Tactile Layer

The tactile layer 130 defines a tactile surface 133 opposite the substrate no. The tactile layer 130 can be of a flexible and/or elastic material that is translucent or transparent, such as polyethylene terephthalate (PET), polycarbonate (PC), silicone, urethane, thermoplastic polyurethane (TPU), acrylic (e.g., acrylic thermoplastic elastomer), ionomers, fluoropolymers, and/or styrenic block copolymers (SBC). However, the tactile layer 130 can also be any other substantially transparent material.

The tactile layer and/or a coating coupled to the tactile layer can also include (e.g., be embedded with or coated with) stabilizers, such as UV, hydrolytic, and/or thermo-oxidative stabilizers. The stabilizers can include UV stabilizers, such as benzophenones, benzotriazoles, hindered amine light stabilizers (HALS), or hydroxyphenyl-benzotriazoles, which absorb UV radiation and prevent formation of free radicals within plastics, thereby resisting discoloration of the tactile interface in response to exposure to UV light. The stabilizers can also include hydrolytic stabilizers for urethanes and thermoplastic polyurethanes (TPU), such as carbodiamide-based stabilizers, to limit surface reaction with the substrate, the tie layer, and the tactile layer and limit delamination or discoloration of the layers. The stabilizers can also include thermo-oxidative stabilizers, such as butylated hydroxytoluene (BHT) and hindered phenols, to resist delamination of the substrate from the tie layer and the tactile layer and/or substantially maintain elasticity of the tactile layer across the lifespan of the tactile layer. The tactile layer can additionally or alternatively include (e.g., embedded in the tactile layer) anti-microbial additives, such as silver, copper, or zinc nanoparticles.

Figure 7A:
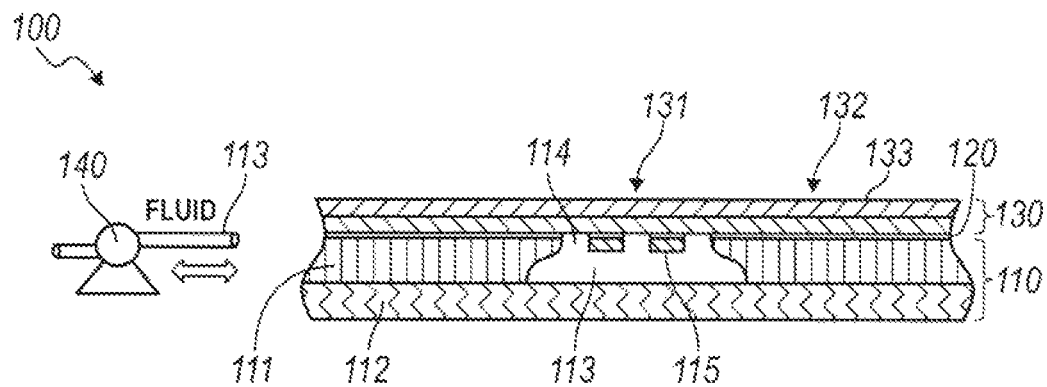
FIGS. 7A and 7B are schematic representations of a tactile interface of the invention.

As shown in FIG. 7A, the tactile layer 130 can include two sublayers, including an outer sublayer and a buffer backing. The outer sublayer can be substantially rigid and durable to resist scratching and can be bonded to the tie layer 120 via the buffer backing. In one example, the outer sublayer is a more rigid material, such as polycarbonate or polyethylene terephthalate (hereinafter "PET"), and the buffer backing is substantially more extensible, has a lower modulus, and is more elastic (e.g., as silicone). The tactile layer 130 is deformable, wherein the outer sublayer deforms and the buffer backing substantially absorbs deformation of the tactile layer 130. Because the outer sublayer can be a substantially transparent polymer, repeated deformation of the tactile interface (and, therefore, the tactile layer) can result in crazing or drawing near the deformation boundary, which can reduce optical clarity near a region of deformation and/or result in plastic deformation of the tactile layer 130 over time. However, the buffer backing can soften or cushion the transition region of the outer sublayer at the border between the deformation. Generally, the buffer backing can stretch in a direction of deformation (e.g., bending of the tactile interface, depression of the tactile surface toward the substrate, and/or shear force applied to the tactile surface). Therefore, the tactile layer 130 that includes an outer sublayer and a buffer backing can exhibit improved scratch-resistance and a glass-like tactile feel at the tactile surface 133 while maintaining optical clarity at deformation boundaries throughout repeated deformation. The tactile layer 130 that includes multiple (e.g., two) sublayers can also enable strain due to application of force on the tactile layer 130 to manifest in the softer (i.e. buffer) sublayer and rather than the harder (outer) sublayer, which can permit less extensible, more durable layers to be used as the outer sublayer of the tactile layer 130.

The tactile surface 133 of the tactile layer 130 can be substantially smooth to the touch. Alternatively, the tactile surface 133 can include a matte, textured, or patterned surface. For example, a matte surface can reduce glare from reflected light and yield beneficial light transmission and light scattering properties at the tactile surface 133. A matte finish can also be applied on top of the tactile surface 133, such as before the tactile layer 130 is bonded to the substrate 110 or before sublayers of the tactile layer 130 are joined. A matte finish or texture can also be applied to the tactile surface 133 during a bonding process to join the tactile layer 130 to the substrate no or to join sublayers of the tactile layer 130. For example, a heated matte-patterned roller can be passed over the tactile surface 133 or a smooth heated roller can press a matte-patterned sheet over the tactile layer 130, either of which can impress a matte pattern into the tactile surface 133. However, other patterns or surface features can be additionally or alternatively applied to the tactile surface 133, another sublayer or surface of the tactile layer 130, other surface or sublayer of the substrate 110, etc. Furthermore, a pattern or finish can be applied to any one or more layers, sublayers, or surfaces of the tactile interface 100 in any other suitable way.

The tactile layer 130 can be bonded to the substrate 110 via the tie layer 120 (as described below), which can retain the tactile layer 130 to the substrate 110 via a mechanical bond by enabling crystalline grain growth across a boundary between the tie layer 120 and the adjacent interior surface of the tactile layer 130. Alternatively, the tie layer 120 can retain the tactile layer 130 against the substrate 110 via covalent bonds, wherein the tie layer 120 bonds covalently with the tactile layer 130 while being retained by the underlying substrate. However, the tie layer 120 can also retain the tactile layer 130 to the substrate 110 via entanglement of polymer strands between layers, hydrogen bonds, Van der Walls bonds, or any other suitable type of chemical and/or mechanical bond or attachment.

Figure 12A:
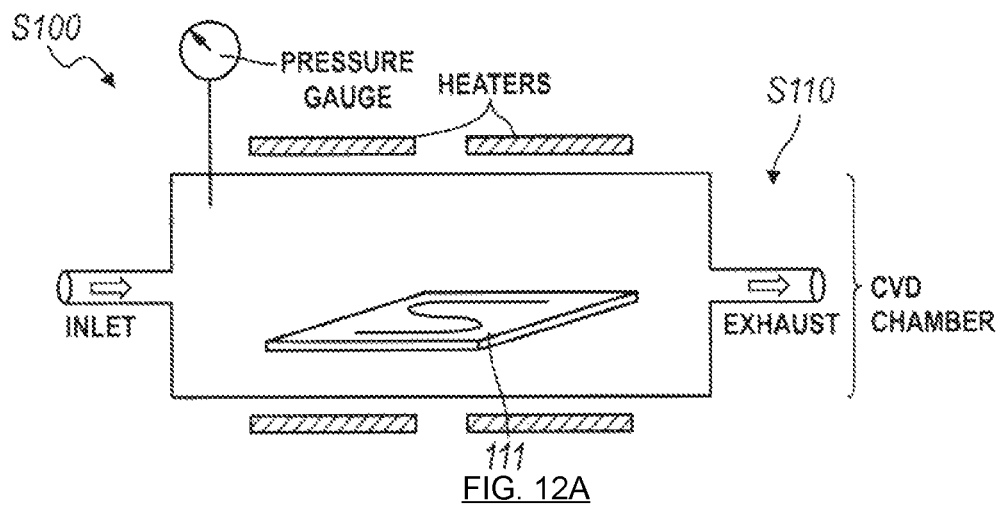
FIGS. 12A-12E are schematic representations of variations of the second method.

In one variation of the tactile interface 100, the tie layer 120, which can be deposited on the substrate (as shown in FIG. 6A), is pre-treated with a corona treatment and/or air plasma treatment. The corona treatment can improve the surface energy and create reactive species of the tie layer 120 in preparation for bonding with the tactile layer 130. The tactile layer 130 and the tie layer 120 can then be stacked, aligned, and laminated. The stack can be laminated by passing the stack through a set of rollers, as shown in FIG. 12D and then cured according to a time, temperature, pressure, and environment schedule, as shown in FIG. 12E, such as at thirty pounds per square inch (or "psi") for two hours at room temperature in a dry nitrogen environment. The stack can then be trimmed to size.

A curing schedule can define application of temperature and pressure to the tactile layer 130 and tie layer over time to yield a substantially adequate bond therebetween. The curing schedule can also improve the bond between the substrate no and the tie layer 120. The bond between the tie layer 120 and the substrate 110 and/or the tactile layer 130 can be a macroscopic mechanical bond, such as a diffusion bond defined by cross-boundary grain growth, such that the tie layer 120 and at least one of the substrate 110 and the tactile layer 130 appear as a singular structure near an edge of the tactile layer 130. Additionally or alternatively, the bond between the tie layer 120 and the substrate 110 and/or the tactile layer 130 can be a chemical bond. For example, atoms or molecules on a first side of a boundary combine with atoms or molecules on a second side of the boundary to form a third material proximal the boundary. The third material can exhibit adequate adhesion to the parent materials on each side of the boundary as well as adequate cohesion between molecules within the third material to retain the tactile layer 130 to the attachment surface 116 of the substrate 110. Furthermore, the curing schedule can include curing in an inert environment, such as nitrogen or argon, to minimize contamination of the bond, which can negatively affect the strength of the bond and/or the optical clarity of the substrate 110 and tactile layer stack. However, the bond between the tie layer 120 and at least one of the substrate 110 and the tactile layer 130 can be any other type of bond or combination of types of bonds.

The tactile layer 130 and substrate can include alignment features, such as printed markers (e.g., "+" or "−" marks) at two or more corners of each of the tactile layer 130 and the substrate no to aid manual alignment or automated alignment via machine vision. Alternatively, the substrate 110 and the tactile layer 130 can be supplied as sheets in separate rolls that are merged as they enter a set of laminator rollers. The set of rollers can be a pair or rollers into which the substrate 110 and tactile layer are fed, or the substrate no and tactile layer can be laminated between a static flat plate and a single roller or laminated between two faces in a press.

One or more rollers or press faces can be heated—such as with an induction heating coil or with a quartz heating rod—to boost bond temperature, which can increase bond strength, improve optical clarity, and/or reduce cure time for the tactile interface.

However, the substrate 110 and tactile layer can be assembled and/or bonded according to any other technique or process.

5. Tie Layer

The tie layer is arranged between the substrate and the tactile layer and is configured to retain the tactile layer against the substrate. Generally, the tie layer can function as an adhesive layer between the substrate and the tactile layer.

The tie layer can include a first adhesive surface configured to bond or adhere to the substrate. The tie layer can also include a second adhesive surface opposite the first adhesive surface and configured to bond to the tactile layer.

The tie layer can be optically clear and/or translucent. For example, the tactile layer 110 can exhibit transmission of light to greater than 90% (e.g., 93%), limit haze to less than or equal to 1%, increase clarity up to or greater than 99%, improve gloss to greater than seventy gloss units, etc.

In one variation, the tie layer can include a layer of (substantially opaque or translucent) ink. In this variation, the tactile interface can be integrated into a peripheral device for a mobile computing device (e.g., a peripheral keyboard) or arranged over an off-screen surface of a computing device with an integrated display or touchscreen. In this variation, the substrate and/or the tactile layer can be substantially transparent, or translucent and the layer of ink 122 can function to obscure a portion of the device over which the layer of ink is arranged. Alternatively, the substrate and/or the tactile layer can be substantially opaque.

The tie layer can also include (e.g., be embedded with or coated with) stabilizers and other additives, such as UV, hydrolytic, and/or thermo-oxidative stabilizers. The stabilizers can include UV stabilizers, such as benzophenones, benzotriazoles, hindered amine light stabilizers (HALS), and/or hydroxyphenyl-benzotriazoles, which can absorb UV radiation and prevent formation of free radicals within layers of the tactile interface, thereby resisting discoloration of the tactile interface in response to exposure to UV light. The stabilizers can also include hydrolytic stablizers for urethanes and thermoplastic polyurethanes (TPU), such as carbodiamide-based stabilizers, to limit surface reaction with the substrate, the tie layer, and the tactile layer and limit delamination and/or discoloration of the layers. The stabilizers can also include thermo-oxidative stabilizers, such as butylated hydroxytoluene (BHT) and hindered phenols, to resist delamination of the substrate from the tie layer and the tactile layer. The tie layer can also include antimicrobial (e.g., antibacterial and/or antifungal) additives, such as silver, copper, or zinc nanoparticles.

In one implementation, the tie layer 120 is deposited on an attachment surface 116 of the substrate. The tie layer 120 can function as an activatable adherent that chemically and/or mechanically bonds the substrate 110 to the tactile layer 130. Generally, the tie layer functions to adhere the tactile layer to the attachment surface at (or across) the peripheral region. In one variation of the dynamic tactile layer, the tie layer can exhibit substantial optical clarity to communicate light across the tactile interface, such as when the tactile interface is arranged over a display of a touch screen. For example, the tie layer 120 can include a silicone oxide film applied to the attachment surface 116 of the substrate 110 via a chemical vapor deposition process, as shown in FIG. 12A. Alternatively, the tie layer 120 can be applied via sputtering, plasma polymerization, mechanical application via a rolling drum, or any other suitable process that yields a silicon oxide film of substantially even thickness across the attachment surface 116. The thickness of the tie layer 120 can be sufficiently thin such that a person interacting with the tactile interface 100 may find difficulty in distinguishing the tie layer 120 by sight and/or by feel. For example, the tie layer 120 can be less than one micrometer (1 μm) in thickness.

In one implementation, the tie layer can be directly cast onto the substrate and/or the tactile layer. For example, a system—including a mixing head, a slot-die coater, a conveying system, and an oven—can mix a prepolymer with solvent to form a viscous material. The prepolymer can be a monomer that has been reacted to an intermediate molecular mass state and is capable of polymerizing to a fully-cured high-molecular weight state, such as a toluene diisocyanate terminated polyester prepolymer 151. The system can add the solvent (e.g., methyl ethyl ketone or "MEK") to dissolve the prepolymer (e.g., in a batch process distinct from a coating process described below). The system can then combine the prepolymer-solvent combination with catalyst (e.g., dibutyltin dilaurate), polymer chain extender (e.g., aromatic diamine curative for polyurethane), cross-linking agent (e.g., ditrimethylolpropane or "DiTMP"), and/or more solvent within a mixing head to form a viscous material (e.g., a mixture). While the system continuously progresses (or translates) the substrate, such as extruded urethane or polyethylene terephthalate, from a first roll across a surface and under a deposition head, the system can distribute the viscous material through a deposition head (e.g., a slot-die coater) onto the substrate. Upon deposition onto the substrate, the viscous material can distribute laterally across the substrate until the viscous material self-levels forming a thin layer of substantially uniform thickness across the substrate as the system conveys the substrate and layer of viscous material across a smooth surface (e.g., a mirror-finish plate) toward an oven. The system can tune a distance between deposition of the viscous material onto the substrate and entry into the oven, such that the layer of viscous material partially cures and polymerizes prior to entry into the oven. The system can then move the substrate and layer of viscous material through the oven, which can heat the layer to drive off the solvent and induce further polymerization and curing of the tie layer. Within the oven, the system can control curing to induce chemical and physical cross-linking of polymers within the tie layer and between the tie layer and the substrate. After exiting the oven, the system can spool the tie layer—prior to or after the tie layer has fully cured—onto a roll, which can then be segmented for assembly into touch-sensitive surfaces and/or other applications. However, the tie layer can also be extruded from a polymer material and/or otherwise formed in any other suitable way.

In another implementation, the tie layer can be adhered to the substrate by dissolving a material of the tie layer (e.g., thermoplastic polyurethane (TPU)) in a solvent mixture. In one implementation of the variation, the tie layer can include thermoplastic polyurethane (TPU) or any other material dissolved in a solvent with solids content of the tie layer material in the solvent solution between eight percent (8%) and fifty percent (50%). In one implementation, TPU can be dissolved in a solution of any of ten to twenty (10-20) parts dimethylformamide (DMF) and five to twelve parts tetrahydrofuran (THF) solvent ratio (by volume). Thus, the solvent mixture can have a solvent mixture ratio of 10:5, 12:7, 20:12, etc. The solvent mixture can be of any solvent, such as acetone, ethyl acetate, dimethyl sulfoxide (DMSO), N-methyl-2-pyrrolidone (NMP), dimethylacetamide (DMAc) and other polar aprotic solvents, or combination of solvents in any concentration. For example, the solvent mixture can include a one-to-one ratio of DMF to THF. The solvent mixture can also be of one solvent, such as DMF or THF. In this variation, the solvent and thermoplastic polyurethane mixture can be coated onto the substrate using any suitable coating method, such as with a metering rod, slot die, Gravure coating method, or Gap coating method. Thus, the solvent and thermoplastic polyurethane mixture can yield a layer of TPU substantially evenly distributed at a particular thickness across the substrate. The tie layer can be of any thickness (e.g., 0.1-2 mil). For example, a DMF and THF solvent mixture can be coated onto a substrate of acrylic with a drawdown bar (e.g., using a rod coating method) in order to substantially evenly distribute the solvent across the substrate and yielding a TPU layer of 0.2 mil thickness across the substrate. After the solvent and material mixture is drawn onto the substrate, the substrate and tie layer can enter an oven (e.g., a vacuum oven or a thermal oven) to dry for a duration of time. The duration of time and temperature of the vacuum oven can be determined by the thickness of the tie layer, the temperature of the oven, the pressure of the vacuum, and desired mechanical properties of the tie layer (e.g., adhesion, elasticity, and optical clarity). Shorter duration of time in the vacuum can limit bubble formation within the tie layer. Bubble formation can reduce optical clarity (e.g., increases haze, reduces light transmission, etc.). Thus, a shorter duration of time in the oven due to direct casting of the tie layer and solvent mixture to the substrate can improve optical clarity over optical clarity of layers cast using other methods and/or requiring longer oven drying times.

In the foregoing implementation, the tie layer can be cast onto the substrate, thereby yielding high solid content (substantially uniformly distributed) across the attachment surface. High solid content and substantially uniform distribution of the solid content render substantially low haze compared to tie layers of lower solid content and/or non-uniform solid content distribution.

The tie layer 120 can be selectively applied to the attachment surface 116. In one implementation, prior to application of the film, a weighted (or magnetized) shield can be placed over the portion of the attachment surface 116, the shield covering a particular area of the tie layer. In this implementation, the shield prevents deposition of silicon oxide over the substrate 110 at the particular area. In another example implementation, prior to application of the film, a sticker-type mask is selectively adhered to the attachment surface 116, specifically at portions that will be aligned with particular regions of the tactile layer 130. Alternatively, the tie layer 120 can be applied across the attachment surface 116 and subsequently selectively removed, such as through laser ablation or plasma etching. However, the tie layer 120 can be (selectively) applied in any other way, can be of any other thickness, and can additionally or alternatively be applied to the interior surface of the tactile layer 130.

Figure 24:
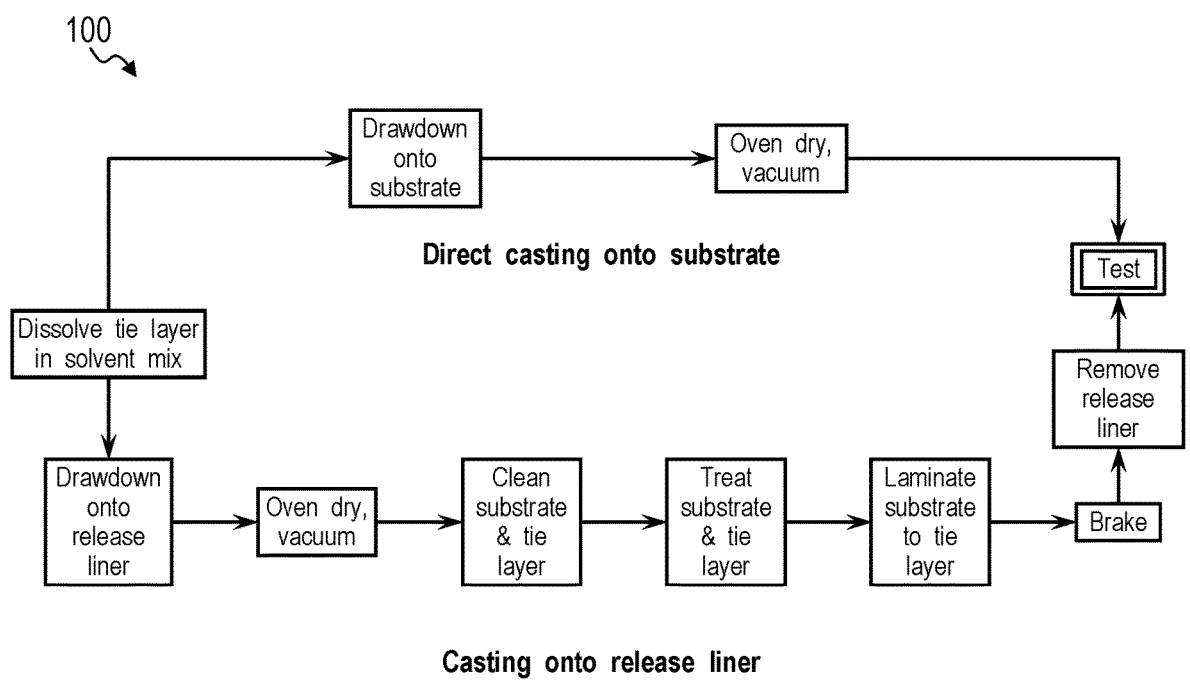
FIG. 24 is a flowchart representation of one variation of the first tactile interface.

In another variation shown in FIG. 24, the dissolved material can be cast onto a release liner and laminated to the substrate or the tactile layer. For example, material of the tie layer (e.g., TPU) can be dissolved in a solvent mixture (e.g., DMF:THF), and coated onto a release liner with a Mayer rod. Then the release liner and the dissolved TPU and solvent mixture can be dried in an oven as described above. The dried release liner can then be cleaned (e.g., with isopropyl alcohol). In this example, after cleaning, the substrate (e.g., acrylic) can be cleaned and treated, such as with nitrogen plasma. Then the release liner with the TPU and solvent mixture can be laminated to the substrate and baked to cure. Finally, the release liner can be removed.

In other variations of the tactile interface 100, a different material, such as polyurethane, epoxy, silicone, titanium, gold, primer, adhesives, an adhesive monomer layer, or any other suitable material or combination of materials enabling adhesion between the tactile layer 130 and the substrate 110, is used in place of silicon oxide to create the film that joins the tactile layer 130 and the substrate 110. In yet other variations of the tactile interface 100, the silicone oxide layer is excluded entirely and the substrate 110 is bonded or coupled directly to the tactile layer 130.

However, the tie layer can be formed and adhered to the substrate and the tactile layer in any other suitable way with any other suitable materials. Furthermore, the substrate and the tactile layer can be adhered by any other means and in any other suitable way.

6. Protective Layer

In one variation, the tactile interface can include a cover sheet (e.g., PET layer) on top of—or in lieu of—the tactile layer opposite the substrate to laminate an upper surface of the tactile layer 130 and protect the tactile layer from particulate contamination and/or defects. In one implementation, the cover sheet can dictate surface texture and/or roughness of the tactile surface. In particular, the cover sheet can include a textured polymer cover sheet that depresses into the tactile surface no of the tactile layer leaving depressions conforming with the textured polymer cover sheet. In this implementation, the tactile layer (and/or a tie layer between the tactile layer and the cover sheet) can be cured to a curing level after exiting the curing device to influence an extent the textured cover sheet imprints onto the tactile layer. For example, the system that deposits and cures the tactile layer can tune a cure time (or schedule) of the tactile layer to reduce tackiness at a time at which the cover sheet is applied to the tactile layer, such that the cover sheet can be readily removed. However, the system can also tune the cure time of the tactile layer to increase tackiness and, therefore, increase adhesion between the tactile layer and the cover sheet after application of the cover sheet to the tactile layer.

In another variation, the cover layer can form an anti-scratch coating and/or a self-healing coating. For example, the cover layer can exhibit characteristics including optically clarity, and/or durability such that the material can be compressed and stretched (e.g., up to 150%-200% of original size). The cover layer can also exhibit ultraviolet absorbency, chemical resistance, hydrophobicity, and/or oleophobicity (or oleophilicity).

The cover layer can include an anti-scratch layer, a protective hard coating, and/or a protective coating that self-heals after impact and/or yields a soft, elastic surface, such as to mimic writing application. For example, the cover layer can be sprayed and/or applied onto the tactile surface of the tactile layer. In this example, the cover layer can define a hard touch surface configured to distribute impacts across the hard touch surface. Furthermore, the tactile layer (located between the hard coating and the tactile layer) can be configured to dampen impact to the substrate 120. In another example, the cover layer can include an anti-scratch layer applied to a liner (e.g., a PET layer). The liner can be removed from anti-scratch layer and the anti-scratch layer can be applied to the tactile surface of the tactile layer.

The cover layer can bond to the tactile layer due of the interaction of the polymer chains between the tactile layer and the cover layer. Additionally or alternatively, the cover layer can include a surface treatment, such as corona discharge or plasma treatment, to induce a hydroxyl effect that promotes covalent bonding between the anti-scratch layer and the tactile surface 110. Therefore, the cover can be affixed to the tactile layer through chemical bonding (e.g., covalent bonds between molecules of film layer and tactile layer), mechanical bonding (e.g., using pressure in a press fitting, with a screw), thermal bonding (e.g., by applying heat to one or both surfaces forming the bonding interface), and/or with an adhesive (e.g., glue).

However, the tactile interface can include any other coating and/or layer to yield any other desired property (e.g., optical, mechanical, and/or chemical) in any other suitable way.

7. Examples

As described above, the tactile interface can include multiple elastic and/or rigid layers adhered together by a tie layer. As described below, the tie layer can be applied over a flexible display, integrated with a curved display, and/or configured to absorb and distribute impacts to the tactile surface and prevent shattering of the tactile surface in response to an impact.

7.1 Flexible Display

Figure 2A:
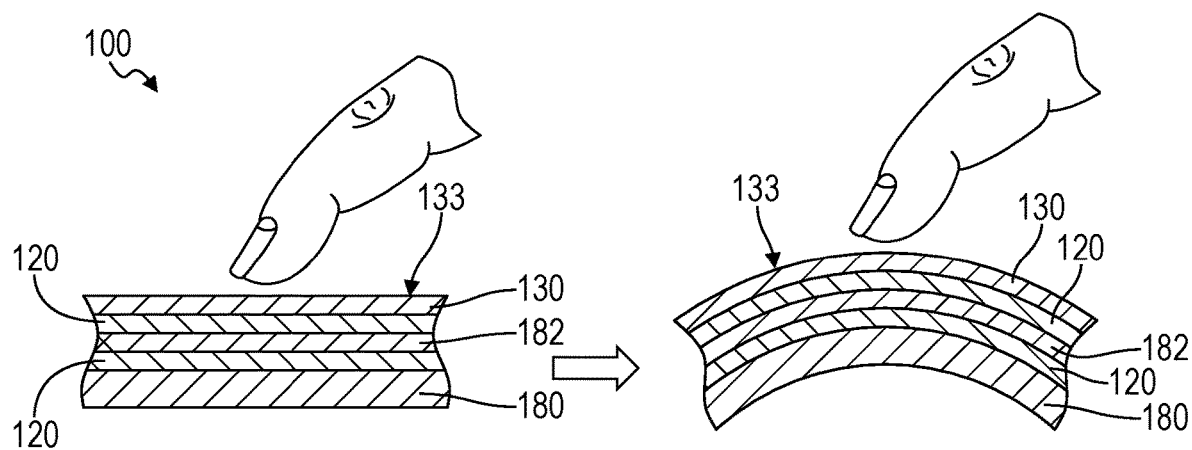
FIGS. 2A and 2B are flowchart representations of a variation of the tactile interface.
Figure 2B:
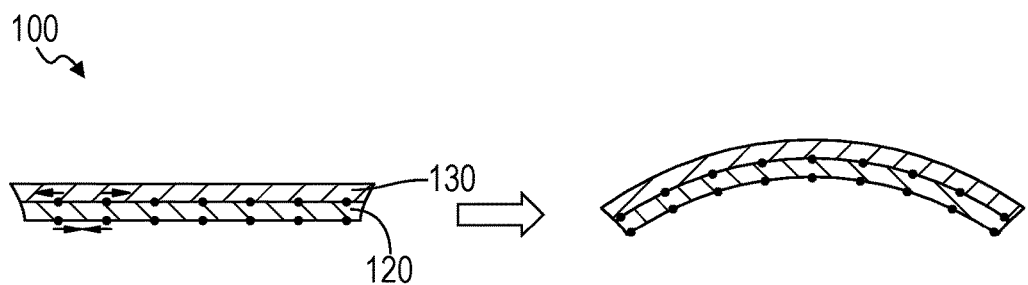

In one example shown in FIGS. 2A and 2B, the tactile interface can define a flexible tactile interface, such as a computing device with a flexible display and/or flexible touch sensor. In this example, the tactile interface can include: a flexible display (e.g., a thin-film transistor organic light-emitting diode or "OLED" display); a polarizer 182; and a flexible tactile layer, such as flexible glass, soda-lime glass, ceramic tile, and/or a polymer layer. In this example, a tie layer can be arranged on (i.e., adhered to, bonded to, and/or cast on) each face of the polarizer. A first tie layer can be arranged between the flexible display and the polarizer and a second tie layer can be arranged between the polarizer and the tactile layer (e.g., on an opposite side of the polarize from the flexible display). Generally, the flexible tactile interface can bend to a particular bend radius and the tie layers between the display, polarizer, and the tactile layer of the tactile interface can maintain optical clarity and adhesion to adjacent layers throughout repeated bending and other deformation.

In this example, a user may bend the tactile interface to a bend radius. To achieve the bend radius, the flexible display, the polarizer, the first and the second tie layer, and the tactile layer can elastically deform to the bend radius while the first and second tie layers elastically stretch to retain adhesion between the flexible display and the polarizer and the polarizer and the tactile layer. In particular, the flexible display, the polarizer, and the tactile layer can each exhibit a different modulus of elasticity and can, therefore, deform at a different rate of deformation in response to application of a force to the tactile surface defined by the tactile layer. Due to chemical and physical cross-linking between polymers of the first tie layer, the first tie layer can exhibit a particular elasticity to enable the tie layer to stretch elastically in tension, compression, torsion, and/or shear directions simultaneously. In this example, the first tie layer can simultaneously stretch—at a first surface adhered to the polarizer—to remain adhered to the polarizer and compress—at a second surface adhered to the flexible display—to remain adhered to the flexible display. Therefore, the first tie layer can stretch to occupy voids between the polarizer and the flexible display that emerge during bending of the tactile surface, thereby limiting optical aberrations resulting by separation of the polarizer from the flexible display.

Similarly, due to chemical and physical cross-linking between polymers of the second tie layer, the second tie layer can exhibit a particular elasticity to enable the second tie layer to stretch elastically in tension, compression, torsion, and/or shear directions simultaneously. In this example, the second tie layer can simultaneously stretch—at a first surface adhered to the tactile layer—to remain adhered to the tactile layer and compress—at a second surface adhered to the polarizer—to remain adhered to the polarizer. Therefore, the second tie layer can occupy voids between the polarizer and the tactile layer that emerge during bending of the tactile surface, thereby limiting optical aberrations resulting by separation of the polarizer from the tactile layer.

In one variation, the tactile interface can include optically clear adhesive 124 applied between the flexible display and the polarizer and between the polarizer and the tactile layer in lieu of the tie layer. However, after curing, the OCA 124 can harden and/or become inflexible. Therefore, in response to repetitive deformation of the OCA 124 (and the tactile interface), the OCA 124 can crack or craze, thereby forming optical aberrations in the OCA 124 visible at the tactile surface.

To avoid formation of optical aberrations, the tactile interface can include the tie layer (in replacement of the OCA 124), which can stretch to conform to deformation and, due to chemical and physical cross-linking of polymers within the tie layer, can resist creep, fatigue, and crazing under repeated deformation. Therefore, chemical and physical cross-linking allows the (combined) tactile interface and tie layer to retain optical clarity throughout bending.

In one implementation, the first tie layer and/or the second tie layer can be directly cast (or deposited) onto the polarizer as described above to form chemical and/or physical cross-links and bonding between polymers of the tie layer and the polymers of the polarizer as described above and in U.S. patent application Ser. No. 15/895,971, which is incorporated herein in its entirety by this reference.

7.2 Curved Display

In another example shown in FIGS. 4, 6A, and 6B, the tactile interface can include: a tactile layer (e.g., cover glass) defining a planar tactile surface and a non-planar edge around a periphery of the planar tactile surface; a tie layer onto which indium titanium oxide (hereinafter "ITO") or other ink 122 can be printed; and a display (e.g., an OLED or liquid crystal display). Generally, the tactile layer can define a tactile surface onto which a user may apply inputs. This tactile surface can include a planar portion arranged directly over a display and can also include a rounded edge (e.g., with a radius of 5 mm) and/or bevel surrounding a periphery of the display.

In one implementation shown in FIG. 6A, the tie layer can include PET or another inelastic polymer layer. Ink (e.g., ITO) can be printed directly on a first surface of the PET. OCA can be applied to a second surface of the tie layer opposite the first surface to adhere the tie layer to the tactile layer. In this implementation, when the tie layer is applied to the tactile layer, the tie layer can wrinkle or warp at edges of the tie layer contacting the non-planar edges of the tactile layer. During application of the tie layer to the tactile layer, the edge of the tie layer is pressed in shear against the radius of the tactile layer causing friction between the OCA and the tactile layer. The (thin) tie layer can then warp, stretch, and/or wrinkle under shear forces during application and form aberrations (e.g., in the ink) visible to a user viewing the edges of the tactile layer.

In another implementation shown in FIG. 6B, the tie layer (e.g., a silicon oxide film) can include an elastic polymer layer described above exhibiting adhesive and/or bonding properties on one or both sides of the tie layer. In this implementation, ink can be applied directly to a first surface of the tie layer. A second surface can exhibit adhesive properties (e.g., tackiness and/or able to bond to the tactile layer). In this implementation, when the tie layer is applied to the tactile layer, the tie layer can stretch to conform to the non-planar edges of the tactile layer. Therefore, the tie layer can stretch to adhere to the tactile layer, thereby limiting aberrations due to wrinkling of the tie layer and visible to a user viewing the edges of the tactile layer.

7.3 Impact Resistance

Figure 5:
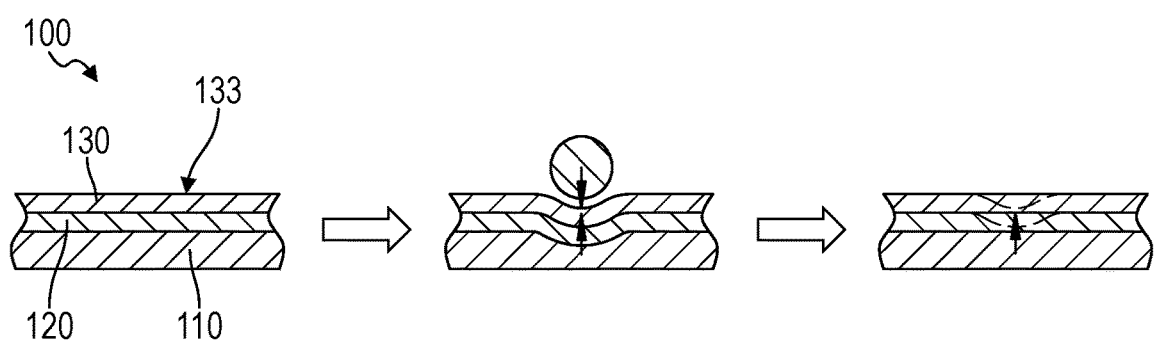
FIG. 5 is a flowchart representation of a variation of the tactile interface.

In another example shown in FIG. 5, the tie layer can be compressible and configured to absorb and distribute impacts to prevent damage to (e.g., shattering of) the tactile surface or underlying touch sensor/display components in response to impacts applied to the tactile surface. Generally, the tie layer—located between the (rigid) tactile layer and the rigid substrate—can be configured to dampen impact to the substrate 120.

Generally, each layer of the tactile interface can exhibit a relaxation time defined as a duration following deformation resulting from an impact to the layer until the layer returns to an equilibrium state (e.g., planar and/or pre-deformation topography). Large differences in relaxation time between layers can result in embrittlement and fatigue of layers with slower relaxation times, eventually yielding an optical aberration. Therefore, each layer of the tactile interface 100 can exhibit closely matched (or identical) relaxation times to avoid fatigue of other layers of the tactile layer.

Figure 13:
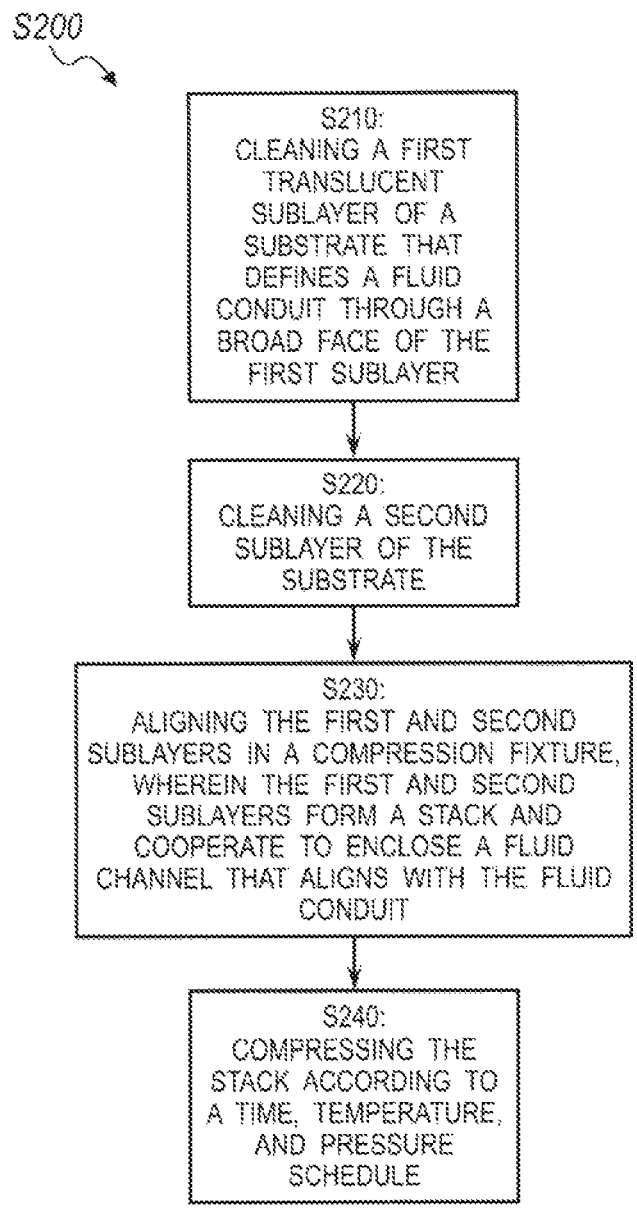
FIG. 13 is a flowchart representation of a first method of one embodiment of the invention.

In another example shown in FIG. 13, the tie layer can exhibit a relaxation time distinct from and less than the relaxation time of the adjacent layers (e.g., the substrate and the tactile layer). In this example, in response to an impact applied to the tactile surface of the tactile layer, the tie layer can morph into a deformed state corresponding to an impact-applying object. After removal of the impact-applying object from the tactile surface 110, the tie layer can recover from the impact to a pre-deformation state quicker than the tactile layer recovers from the impact to a pre-deformation state. In this example, the tie layer can cooperate with the tactile layer to push the tactile layer back to the pre-deformation state (i.e., a planar surface) and quickly return the tactile surface 110 to an equilibrium state as a result of the tie layer's more rapid recovery time.

8. Deformable Regions

Figure 7B:
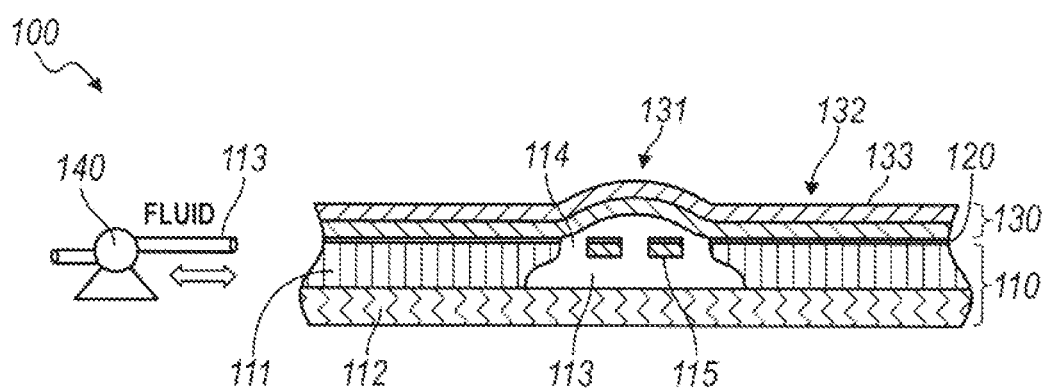

As shown in FIGS. 7A and 7B, a first dynamic tactile interface 100 includes: a substrate 110, a tie layer 120, a tactile layer 130, and a displacement device 140. The substrate 110 defines an attachment surface 116, a support surface 115 continuous with the attachment surface 116, a fluid channel 113, and a fluid conduit 114 configured to communicate fluid from the fluid channel 113 through the support surface 115. The tie layer 120 is deposited onto (e.g., adhered to or cast onto) the attachment surface 116. The tactile layer 130 includes a peripheral region 132 bonded to the tie layer 120, includes a deformable region 131 adjacent the support surface 115 and disconnected from the tie layer 120, and defines a tactile surface 133 opposite the substrate 110. The displacement device 140 is configured to displace fluid into the fluid channel 113 to transition the deformable region 131 from a retracted setting to an expanded setting, wherein the tactile surface 133 at the deformable region 131 is flush with the tactile surface 133 at the peripheral region 132 in the retracted setting (shown in FIG. 7A) and is offset from the surface at the peripheral region 132 in the expanded setting (shown in FIG. 7B).

Figure 25:
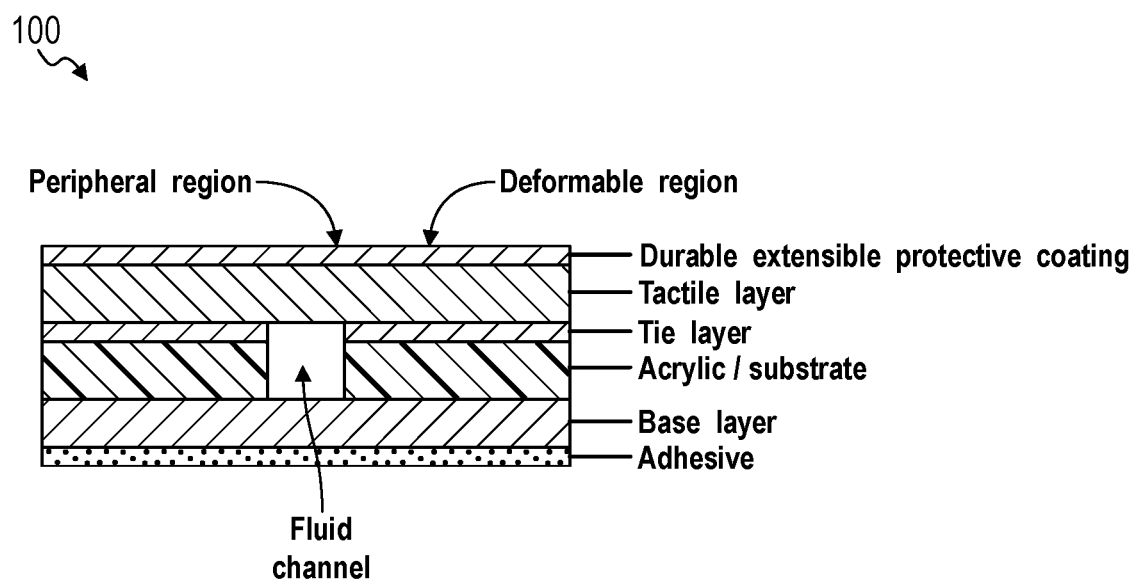
FIG. 25 is a schematic representation of one variation of the first tactile interface.

One variation of the first dynamic tactile interface 100, shown in FIG. 25, further includes a coating coupled to the tactile layer opposite the tie layer and a base layer coupled to a back surface the substrate opposite the attachment surface. This variation can also include an adhesive adhered to the base layer opposite the substrate.

Generally, the first dynamic tactile interface 100 can be incorporated into or applied over a display and/or over a computing device, such as a smartphone or a tablet, and define one or more deformable regions of a tactile layer that can be selectively expanded and retracted to intermittently provide tactile guidance to a user interacting with the computing device. In one implementation, the first dynamic tactile interface 100 is integrated into a touchscreen of a mobile computing device, and the first dynamic tactile interface 100 can include a set of round or rectangular deformable regions, each deformable region substantially aligned with a key of a virtual keyboard displayed on the mobile computing device. In this implementation, the deformable regions can, thus, mimic physical hard keys when in the expanded setting, but when the keyboard is not displayed on the mobile computing device, the deformable regions can retract to yield a uniform, flush tactile layer. In this implementation, the first dynamic tactile interface 100 can also include an elongated deformable region that, in the expanded setting, aligns with a virtual 'swipe-to-unlock' input region rendered on the display 180, and the elongated deformable region in the expanded setting can, thus, provide tactile guidance to a user unlocking the mobile computing device. The elongated deformable region can subsequently transition into the retracted setting to yield a uniform, flush surface over the display 180, such as once the mobile computing device is unlocked and the 'swipe-to-unlock' input region is no longer rendered on the display 180.

8.1 Substrate

The fluid channel 113 can be a blind channel defined within the substrate 110. In one variation of the first dynamic tactile interface 100 shown in FIGS. 7A and 7B, the substrate 110 includes a first sublayer in and a second sublayer 112 that, when joined, cooperate to define and to enclose the fluid channel 113. The first sublayer 111 can define the attachment surface 116, and the fluid conduit 114 can pass through the first sublayer 111 to the attachment surface 116. In this variation, the first and second sublayers can be of the same or similar materials, such as PMMA for both of the sublayers or surface-treated PMMA for the first sublayer in and standard PMMA for the second sublayer 112.

The fluid channel 113 can be one of a set of fluid channels that communicate fluid to one or more fluid conduits of the deformable region 131. Fluid channels in the set of fluids channels can also intersect, such as in the vicinity of the deformable region 131. Implementation of multiple channels feeding fluid to the deformable region 131 can increase flow rate to or from the deformable region 131, thus yielding faster transitions between retracted and expanded settings. This can additionally or alternatively enable implementation of fluid channels of smaller cross-sectional areas, which may be less visible to a user. Multiple fluid channels can be incorporated into a system configured to independently expand one or more deformable regions simultaneously.

Figure 15A:
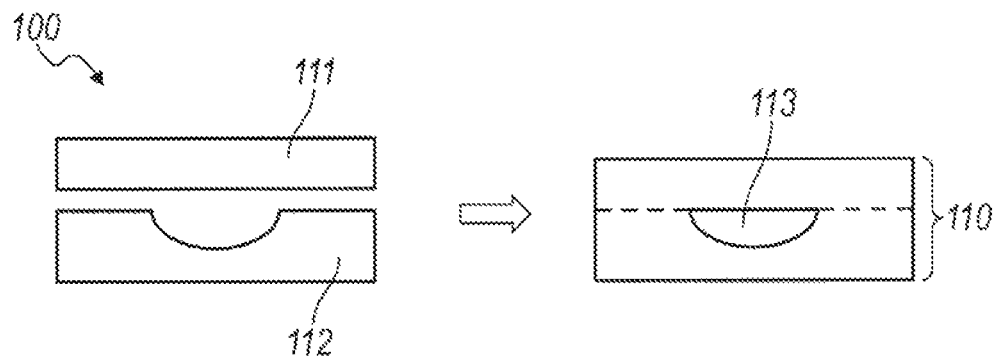
FIGS. 15A, 15B, and 15C are schematic representations of variations of the first tactile interface.

As shown in FIG. 15A, the fluid channel 113 can be created by forming (or cutting, stamping, casting, etc.) an open channel in the first sublayer in of the substrate 110 and then enclosing the channel with a second sublayer 112

Figure 15B:
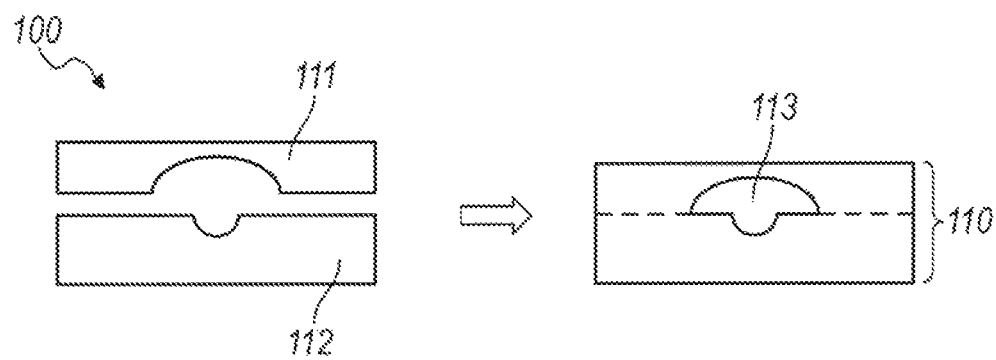
Figure 15C:
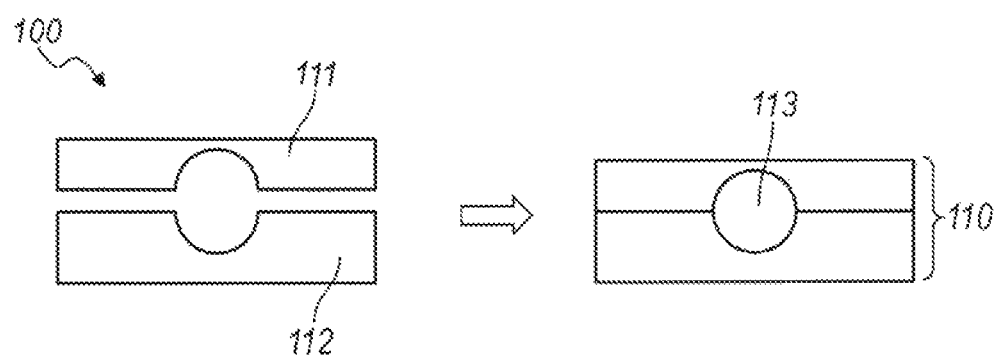

(without a channel feature) to form the enclosed fluid channel and the substrate 110. Alternatively, as shown in FIGS. 15A and 15B, the substrate can include two sublayers, including a first sublayer 111 defining an upper open channel section and including a second sublayer 112 defining a lower open channel that cooperates with the upper open channel to define the fluid channel 113 when the first and second sublayers 111, 112 are aligned and joined. For example, each sublayer can include a semi-circular open channel, wherein the sublayers, when bonded together, form an enclosed fluid channel with a circular cross-section, as shown in FIG. 15C. Because small cross-sections may affect fluid flow rate through the fluid channel 113, this fluid channel geometry may enable higher flow rates than other cross-sections. However, the substrate 110 can define a fluid channel of any suitable cross-section, such as square, rectangular, circular, semi-circular, ovular, etc.

Figure 14A:
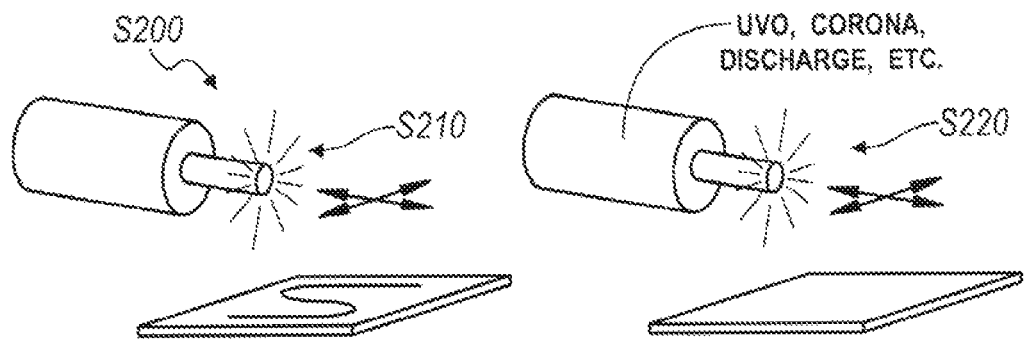
FIGS. 14A, 14B, and 14C are schematic representations of variations of the first method.

In one example implementation, the fluid channel 113 and the fluid conduit 114 are cut into the first sublayer in opposite the attachment surface 116 via conventional machining. The first and second sublayers can then be treated and surface activated in ultraviolet ozone for a specified period of time (e.g., several minutes), as shown in FIG. 14A. The first and second sublayers can then be stacked in alignment on a compression fixture (shown in FIG. 14B) and compressed according to a time, temperature, and pressure schedule (shown in FIG. 14C), such as one hour at 300 psi of compression at a temperature of 50° C. The stack can also be compressed according to an environment schedule throughout a portion or all of the compression cycle, such as an environment that is dry argon, wet hydrogen (i.e., hydrogen mixed with small quantities of air or water), or vacuum (e.g., 10^-6 Torr). The stack can additionally or alternatively be laminated in a compression machine (e.g., with rollers) that bonds the layers of the stack by applying pressure and/or heat across portions of the stack over time.

The first dynamic tactile interface 100 can also include multiple substrates, each defining one or more fluid channels and vias, such as shown and described in U.S. patent application Ser. No. 12/652,704, which is incorporated in its entirety by this reference. In this implementation, substrates can be stacked with vias in alignment to enable communication of fluid across multiple substrate layers, and the stack of substrates can then be bonded according to any of the foregoing or forthcoming methods or techniques.

Figure 8:
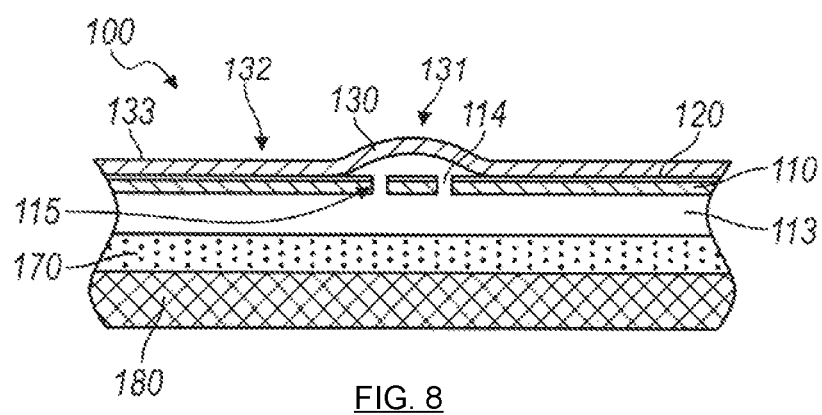
FIG. 8 is a schematic representation of one variation of the first tactile interface.

The compression fixture implemented in the foregoing example implementation can be a two-part fixture including a cope side and a drag side. Each of the cope and drag sides can include a bonding surface and a support surface that supports the bonding surface via one or more flexures, as shown in FIG. 8. In this example implementation, the sheet materials that define the substrate 110 and the tactile layer 130 can extend beyond the compression portions of the compression fixture (e.g., beyond the flexure), which can reduce distortion of the substrate 110 and tactile layer proximal the boundary of the compression portions of the compression fixture. Furthermore, alignment features integral with the sheet materials that define the substrate no and the tactile layer 130 can be arranged beyond the portions of the materials within the compression portions of the compression fixture. Each side of the compression fixture also can include a recess with geometry, form, and width correlating with and/or substantially similar to that of the fluid channel 113 such the stack can be set between the cope and drag plates and compressed without collapsing the fluid channel 113. The cope and/or drag plates can also include locating features that align the stack with the recess. Furthermore, the drag side can include at least one male locating feature, and the cope side can include at least one female locating feature such that the halves of the compression fixture can be repeatably aligned.

In the foregoing example implementation, the first sublayer of the substrate 110 can include an open valley opposite the attachment surface 116, wherein the open valley substantially defines the fluid channel 113 when the first and second sublayers are joined. The first sublayer in also can include at least one through-bore that passes from a portion of the fluid channel 113 to the attachment surface 116 such that the fluid channel 113 and fluid conduit can be formed in the first sublayer in substantially simultaneously and/or in the same manufacturing setup. However, in this or other manufacturing implementations, the fluid channel 113 and/or fluid conduit can be created in the substrate 110 (e.g., in the second sublayer 112 and/or in the first sublayer iii) via any suitable manufacturing technique, such as by etching, drilling, punching, stamping, molding, casting, etching, bulk micromachining, or any other suitable manufacturing process. Furthermore, the first and second sublayers can be cleaned, treated, and/or activated via any other process, or combination of processes, such as via low-temperature heating in a vacuum, via etching, or via a solvent wipe. The stack can also be compressed according to any other time, temperature, pressure, and/or environment schedule. Following assembly, the stack can be further post-annealed, such as by heating the stack according to a particular time, temperature, and/or environment schedule to modify the crystalline (e.g., grain) structure with the layers of the stack.

8.1.1 Method for Enclosing a Fluid Channel

Figure 14B:
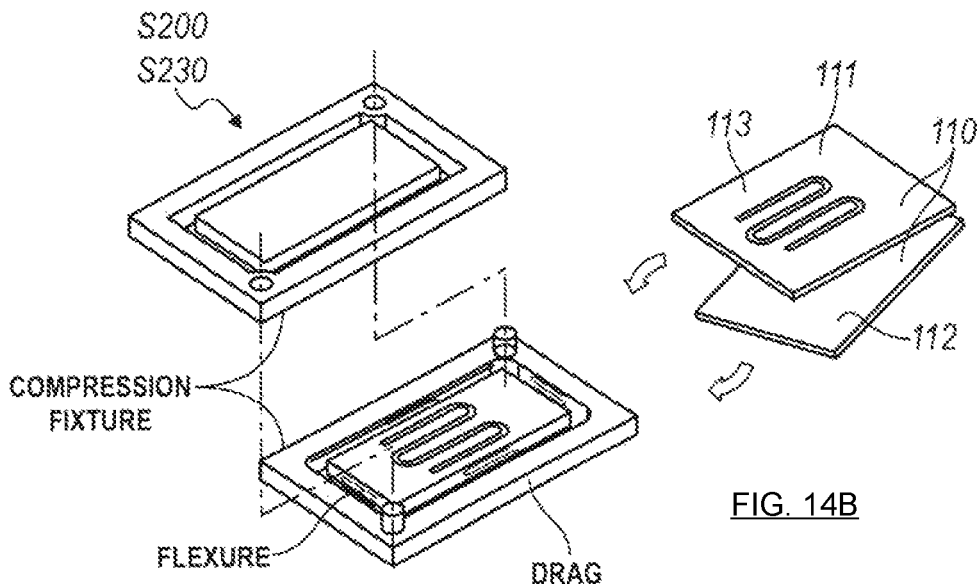
Figure 14C:
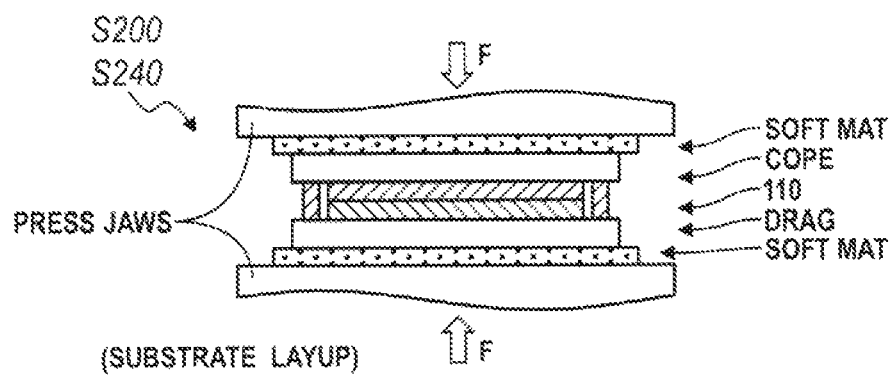

Therefore, as shown in FIG. 13, a first method S100 for enclosing a fluid channel 113 within a substrate 110 includes: cleaning a first translucent sublayer of the substrate 110 that defines a fluid conduit 114 through a broad face of the first sublayer in as shown in FIG. 14A as Block Silo; cleaning a second sublayer 112 of the substrate 110 as shown in FIG. 14B as Block S120; aligning the first and second sublayers 111, 112 in a compression fixture, wherein the first and second sublayers 111, 112 form a stack and cooperate to enclose the fluid channel 113 that aligns with the fluid conduit 114 as shown in FIG. 14C as Block S130; and compressing the stack according to a time, temperature, and pressure schedule as shown in FIG. 8D as Block S140.

The first method S100 can be implemented to join the first and second sublayers 111, 112 of the substrate 110 of the first dynamic tactile interface 100, as described above. The first method S100 can therefore also include curing the sublayer stack according to a time, temperature, pressure, and environment schedule. However, the first method S100 can include any other procedure implemented in any other way to enclose the fluid channel 113 within the substrate 110.

Figure 10:
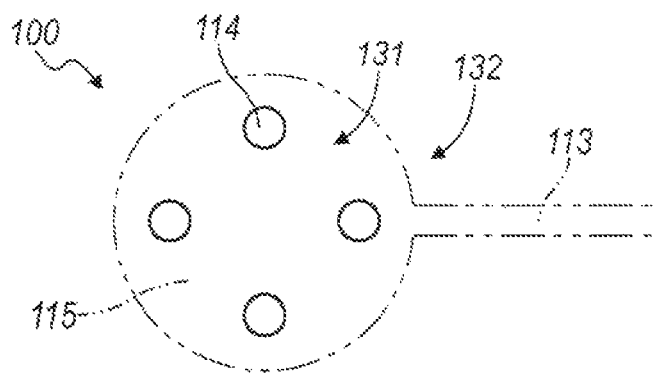
FIG. 10 is a schematic representation of one variation of the first tactile interface.
Figure 11:
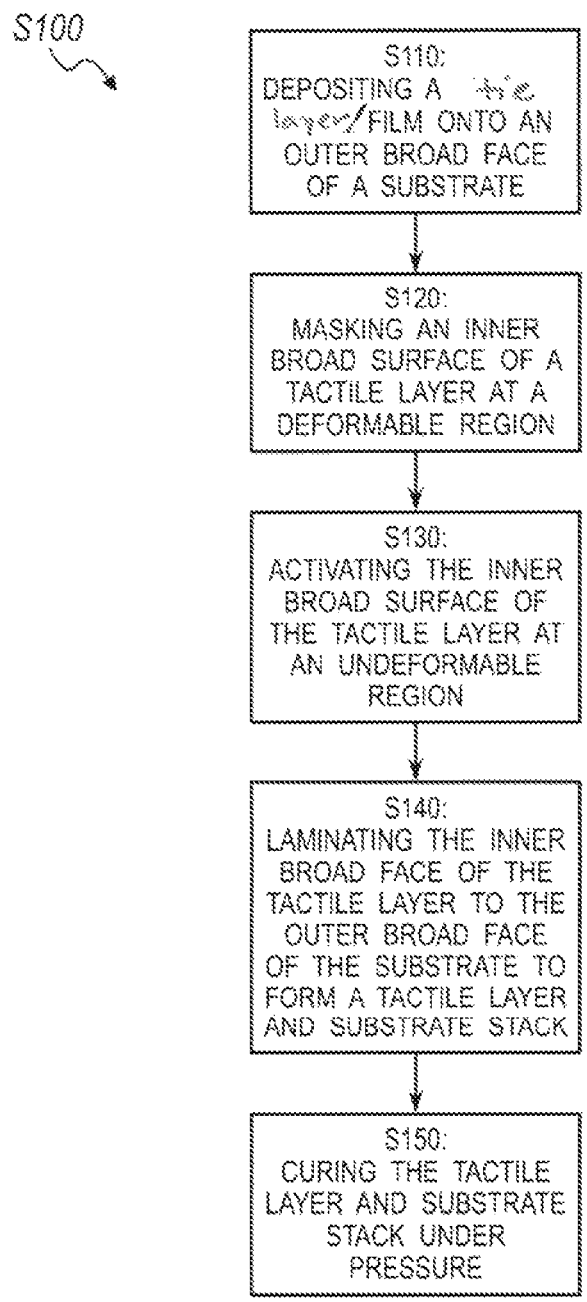
FIG. 11 is a flowchart representation of a second method.

As shown in FIGS. 1 and 10, the substrate 110 can further define a support surface 115 adjacent the deformable region 131, wherein the support surface 115 defines a hard stop for the tactile layer 130 that resists inward deformation of the deformable region 131 due to an input on the tactile surface 133. The support surface 115 can further be in-plane with the attachment surface 116 proximal the peripheral region 132 such that the support surface 115 resists inward deformation of the deformable region 131 past the plane of the peripheral region 132, though the support surface 115 can be of any other geometry or form. The fluid conduit 114 can pass through the support surface 115 such that the fluid conduit 114 can communicate fluid from the fluid channel 113 to the interior surface of the tactile layer 130 to transition the deformable region 131 between settings.

The fluid channel 113 can be defined as an elongated recess of constant cross-section and depth through the substrate 110. The cross-section of the fluid channel 113 can be rectilinear, though the cross-section of the fluid channel 113 can alternatively be circular, semi-circular, curvilinear, ovular, triangular, trapezoidal, elliptical, or any other suitable cross-section. The fluid channel 113 also can include a series of orthogonal linear segments that meet at arcuate or filleted sections (shown in FIG. 9) to form a serpentine path configured to communicate fluid to a plurality of adjacent deformable regions separated by peripheral regions. The substrate no can also define the fluid channel 113 that is of varying cross section along its length, such as varying width, constant-width with oscillating profile along the length of the fluid channel 113, or a sinusoidal, waveform, or 'squiggle' oscillating profile. The cross-section (e.g., geometry, height, width, etc.) of the fluid channel 113 (and/or fluid conduit) can be tailored for particular speed and/or pressure of fluid flow at one or more particular regions along the length of the fluid channel 113. Furthermore, the substrate 110 can also define the fluid channel 113 that is an open channel or a sunk (e.g., buried) channel, or the substrate 110 can define the fluid channel 113 in any other suitable way. However, the fluid channel 113 can be of any other constant or varying depth, any other constant or varying cross-section, linear or non-linear path, linear or non-linear profile, or of any other geometry, profile, form, or path.

Figure 17A:
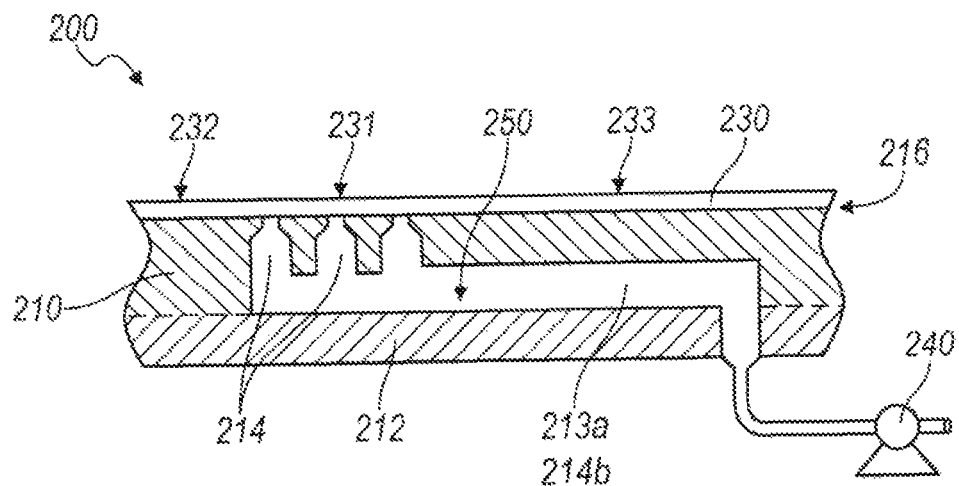
FIGS. 17A and 17B are schematic representations of a second tactile interface.
Figure 17B:
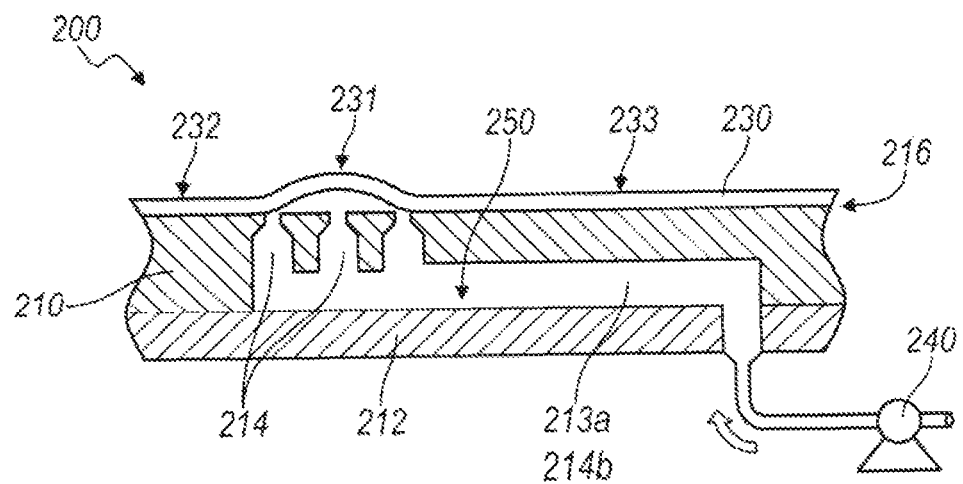
Figure 23A:
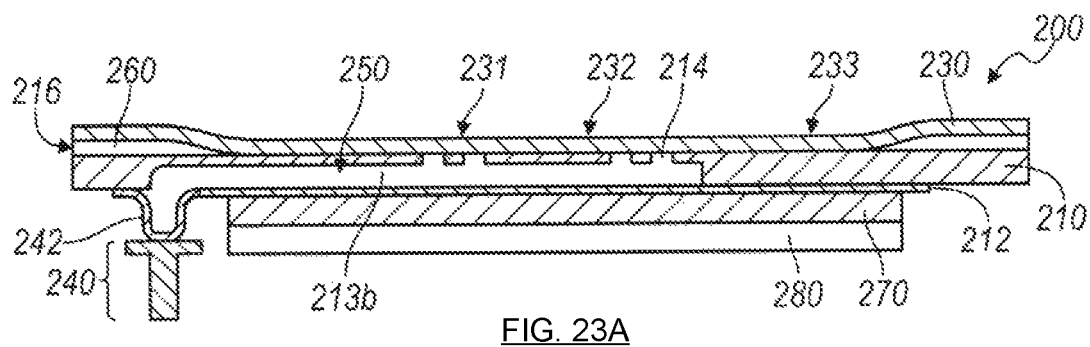
FIGS. 23A and 23B are schematic representations of one variation of the first tactile interface.

The fluid conduit 114 can be circular in cross-section and normal to the attachment surface 116 or of any other profile and/or cross-section. The fluid conduit 114 can also be one in a set of fluid conduits paired with the deformable region 131, wherein the set of fluid conduits cooperate to direct fluid between the fluid channel 113 and the interior surface of the tactile layer 130. Furthermore, the cross-sectional area of the fluid conduit 114 at the attachment surface 116 can be less than the cross-sectional area of the fluid channel 113 at the junction with the fluid conduit 114, such as shown in FIGS. 23A and 17B. However, the fluid conduit 114 can be of any other form, geometry, or profile.

The substrate no can further define one or more drainage holes 117 fluidly coupled to the fluid conduit 114 and to the fluid channel 113. The drainage holes 117 can be in fluid communication with the back surface of the deformable region 131 and adjacent the fluid conduit 114. For example, the fluid conduit 114 can define an outlet substantially proximal the center of the deformable region 131 and the drainage hole 117 can define a fluid inlet substantially proximal and within the boundary of the deformable region 131, and the outlet of the drainage hole 117 can be coupled to the fluid channel 113 to communicate fluid back into the fluid channel 113. Furthermore, the cross-section of the drainage holes 117 can be substantially smaller than the cross-section of the fluid conduit 114 such that the fluid conduit 114 defines a primary fluid path to communicate fluid toward and away from the back surface of the deformable region 131. The drainage hole 117 can, thus, function to permit additional fluid, trapped under the deformable button during a transition to the retracted setting, to passively escape a fluid cavity between the substrate no and the back surface of the deformable region 131. This can enable more complete drainage of fluid from the cavity and, thus, a more predictable and/or consistent form of the deformable region 131 in the retracted setting. Generally, the fluid can be actively pumped into and/or out of the fluid cavity via the fluid conduit 114 to transition the deformable region 131 between expanded and retracted settings, and fluid can passively move out of the cavity via the drainage holes 117 to improve efficacy of transitions into the retracted setting. However, the drainage hole 117 can additionally or alternatively be coupled to a drainage source that actively draws fluid out of the fluid cavity to actively retract the deformable region 131, though the drainage hole 117 can function in any other suitable way.

Figure 16A:
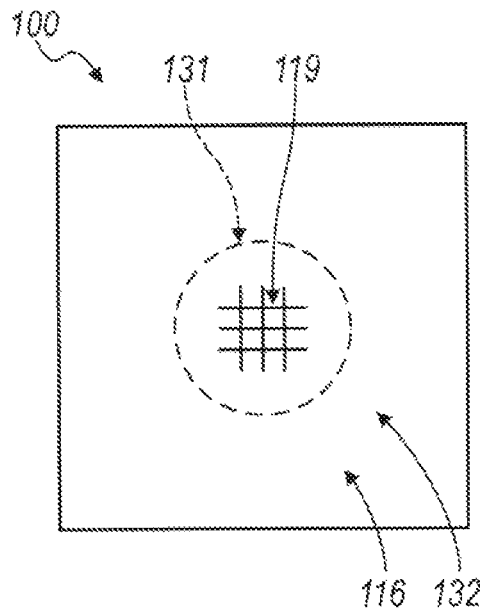
FIGS. 16A, 16B, 16C, and 16D are schematic representations of variations of the first tactile interface.
Figure 16B:
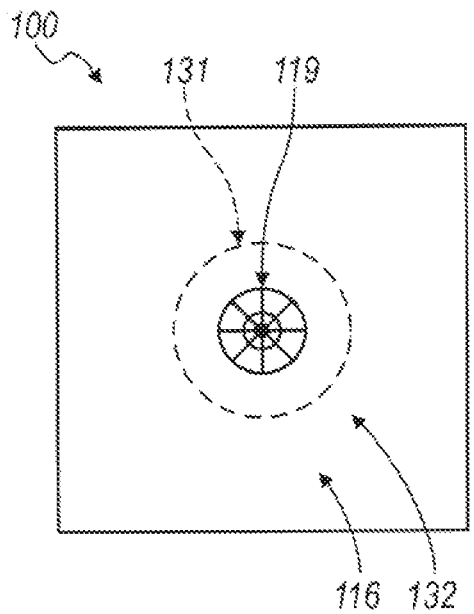
Figure 16C:
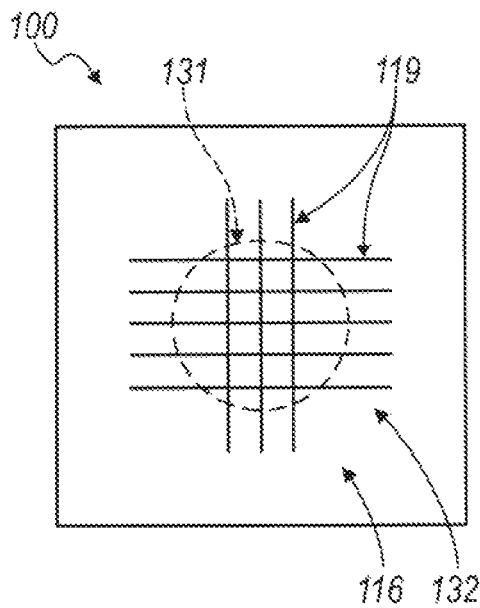
Figure 16D:
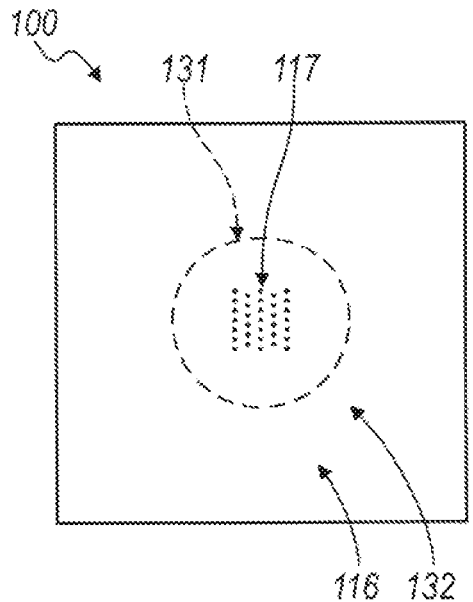

As shown in FIGS. 16A-16C, the attachment surface 116 can also define one or more grooves 119 that provide additional paths for fluid to flow into or out of the fluid conduit 114 and/or drainage holes 117 during a transition between the retracted and expanded settings. Like the drainage hole 117, grooves 119 can assist removal of fluid from the fluid cavity and, thus, prevent fluid from being trapped between the tactile layer 130 and the substrate 110. The grooves 119 can be shallow, deep, narrow, wide, or of any other constant or varying cross-section or geometry and can also feature microtexturing or other suitable surface treatment or profile. The grooves 119 can extend only over the portion of the substrate 110 adjacent the deformable region 131 (shown in FIGS. 16A and 16B) or into the peripheral region 132 (shown in FIG. 16C). The substrate 110 can define multiple grooves, such as grooves that intersect across the portion of the substrate 110 adjacent the deformable region 131 of the tactile layer 130, such as in a checkerboard pattern (shown in FIGS. 16A and 16C), a pattern of radiating lines and concentric circles (shown in FIG. 16B), or randomly arranged linear or nonlinear grooves. The back surface of the tactile layer 130 can also define ridges that align with and substantially dip into or fill the groove(s) in the retracted setting. Alternatively, the back surface of the tactile layer 130 can define one or more grooves, and the attachment surface 116 can also define one or more ridges that align with and fill one or more grooves in the tactile layer 130 in the retracted setting.

The form, profile, surface finish, and/or geometry of the fluid conduit 114 and the fluid channel 113 can be selected to limit optical distortion of an image transmitted through the substrate 110, such as scattering, diffraction, refraction, or reflection. These variables can also be tailored to inhibit unwanted back-reflection of impinging light, such as from an external light source or the sun. Furthermore, these variables can also be tailored to limit directional or preferential light scattering in a particular direction in favor of even distribution of light scattering or refraction through the substrate 110 and the tactile layer 130. The fluid channel 113 and fluid conduit can further include concave or convex fillets of constant or varying radii at any edge, corner, or apex such that unwanted optical distortion, such as scattering, reflection, refraction, and/or diffraction, can be minimized at such features. Additionally or alternatively, the fluid channel 113 and/or fluid conduit can be of a substantially small cross-sectional area that reduces light scattering at a fluid-substrate boundary or interface. The fluid channel 113, fluid conduit, and tactile layer can also be substantially clean before the first dynamic tactile interface 100 is filled with fluid in order to promote wetting and/or to minimize nucleation sites (e.g., for bubbles) throughout the fluid path(s) within the first dynamic tactile interface 100. Air can also be evacuated from the fluid channel 113, fluid conduit, and tactile layer can also be prior to filling the first dynamic tactile interface 100 with fluid. The fluid channel 113 and/or fluid conduit can also be hydrophobic or hydrophilic. The geometry and/or the minimal cross-sectional area of the fluid conduit 114 and the fluid channel 113 can render the fluid conduit 114 and the fluid channel 113 substantially optically imperceptible to a user. The geometry and/or the minimal cross-sectional area of the fluid conduit 114 and the fluid channel 113 can also limit optical distortion through the substrate 110 to less than a just noticeable difference, such as at a typical working distance of twelve inches between the tactile surface 133 and an eye of a user. Generally, the geometry and/or minimal cross-sectional area of the fluid paths can yield the benefit of limiting optical abnormalities of the first dynamic tactile interface 100 below a just noticeable difference.

8.2 Tactile Layer

The tactile layer 130 can be of uniform composition across the deformable and peripheral regions. However, the tactile layer 130 can be selectively flexible or elastic. For example, materials arranged at the deformable region 131 can be substantially flexible or elastic and materials arranged at the peripheral region 132 can be substantially less flexible or less elastic. The tactile layer 130 can also be of uniform thickness, such as less than one millimeter (1 mm) across the deformable and peripheral regions. However, the tactile layer 130 can alternatively be of non-uniform thickness. For example, the tactile layer 130 can be thinner at the deformable region 131 than at the peripheral region 132 to increase flexibility at the deformable region 131. In another example, the tactile layer 130 can be thicker at the deformable region 131 than at the peripheral region 132 such that the tactile surface 133 of deformable region defines a lip or edge on the tactile surface 133. In a further example, the tactile layer 130 can be thicker at the deformable region 131 than at the peripheral region 132 such that the deformable region 131 extends into a recess on the interior surface of the substrate 110 adjacent the fluid conduit 114, wherein the recess includes the support surface 115 that supports the extension of the deformable region 131 to prevent inward deformation of the deformable region 131 in the retracted setting due to an input on the tactile surface 133. In still another example, the interior surface of the tactile layer 130 can include a valley that at least partially defines the fluid channel 113 when the tactile layer 130 is bonded to the substrate 110. However, the tactile layer 130 can be of any other form or geometry.

The second method S200 can be implemented to bond the tactile layer 130 and the substrate 110 of the user interface 100, as described above. The second method S200 can further include cleaning or activating the tie layer 120, such as with a corona treatment, ultraviolet ozone treatment, low-pressure plasma, corona discharge, etching, flame treatment, or solvent wipe, as described above. The second method S200 can also include masking a portion of the outer broad face of the substrate 110 that is aligned with the deformable region 131 of the tactile layer 130 in the tactile layer 130 and substrate 110 stack. The second method S200 can therefore further include removing the mask from the inner broad face of the tactile layer 130 and/or from the outer broad face of the substrate 110. However, the second method S200 can include any other procedure implemented in any other way to bond the tactile layer 130 to the substrate 110.

Figure 12B:
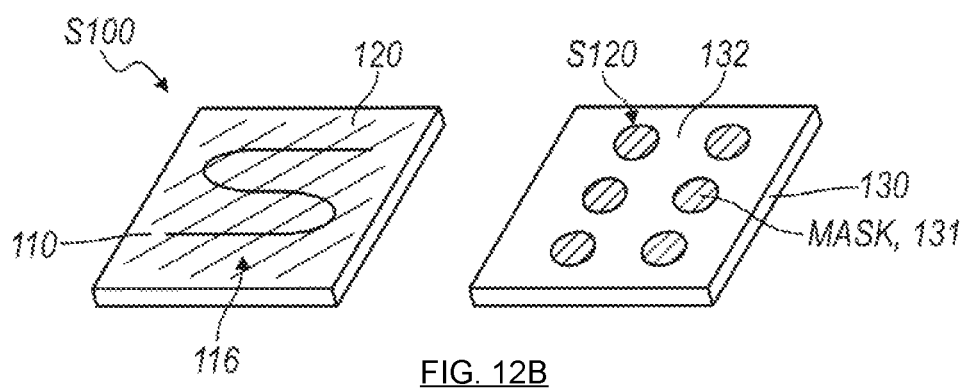
Figure 12C:
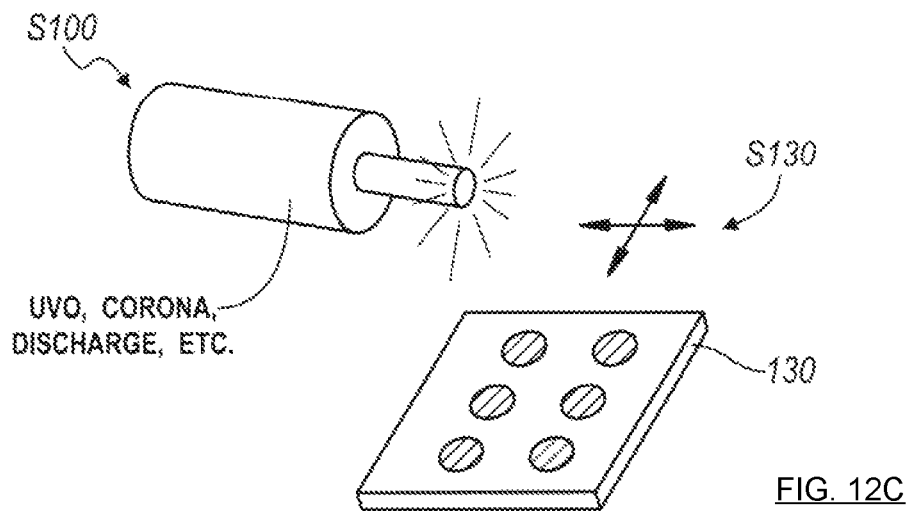
Figure 12D:
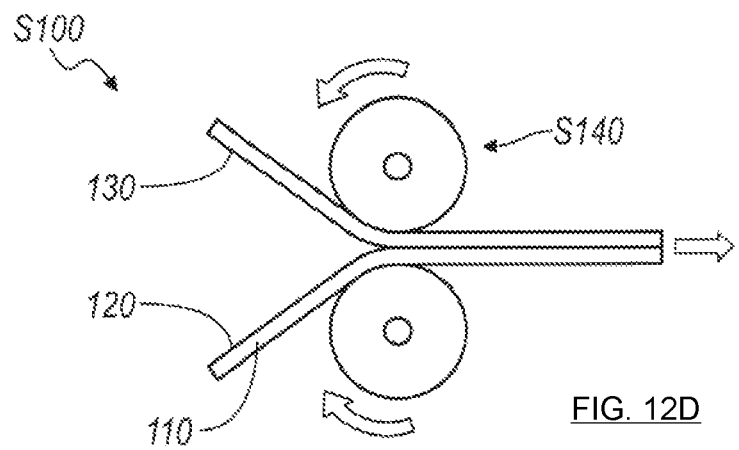
Figure 12E:
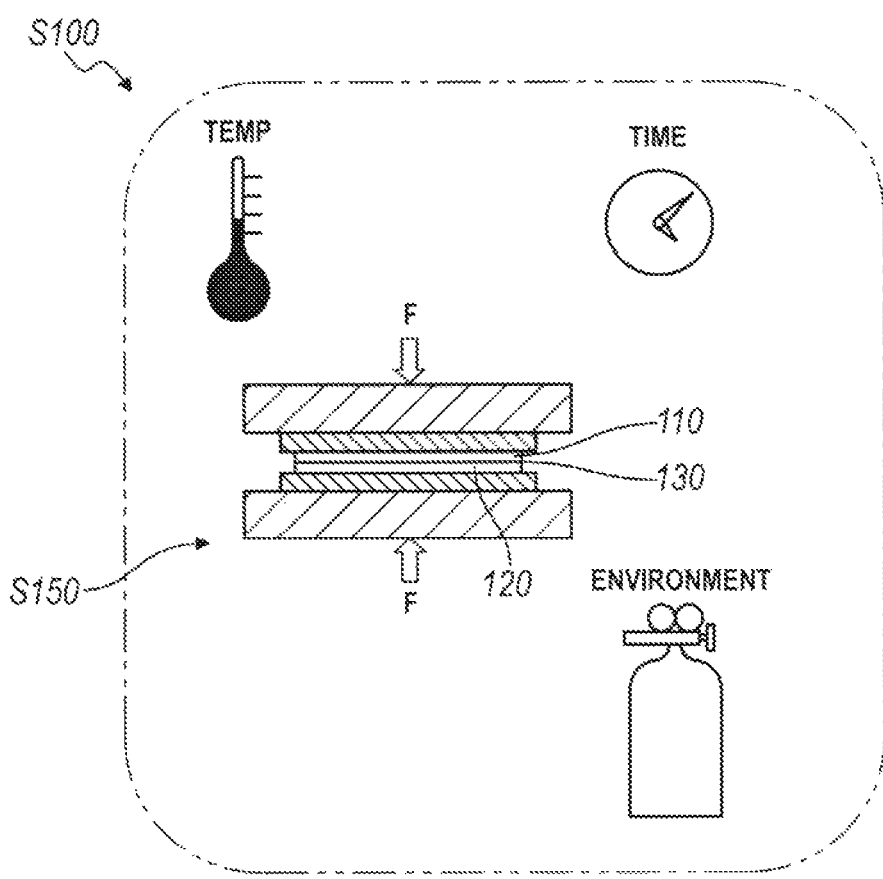

The interior surface of the tactile layer 130 can be masked at the deformable region 131, as shown in FIG. 12B, and then pre-treated with a corona treatment and/or cleaned in ultraviolet ozone, as shown in FIG. 12C. At least one of these processes can prepare the interior surface of the tactile layer 130 for bonding at exposed areas only, which can include the peripheral region 132 and exclude the deformable region 131 such that the deformable region 131 remains disconnected from the substrate 110 via the tie layer 120.

8.3 Displacement Device

The displacement device 140 of the first dynamic tactile interface 100 is coupled to the fluid channel 113 and is configured to displace fluid through the fluid channel 113 to transition the deformable region 131 from the retracted setting to the expanded setting. Generally, the displacement device 140 can actively displace fluid through the fluid channel 113 and the fluid conduit 114 to outwardly expand the deformable region 131 to transition the deformable region 131 from the retracted setting to the expanded setting. Furthermore, the displacement device 140 can actively remove fluid from the fluid channel 113 and the fluid conduit 114 to inwardly retract the deformable region 131 to transition the deformable region 131 from the expanded setting to the retracted setting. The displacement device 140 can also transition the deformable region 131 to one or more intermediate positions or height settings between the expanded and retracted settings. In the retracted setting, the tactile surface 133 at the deformable region 131 can be in-plane or aligned with the tactile surface 133 at the peripheral region 132. However, in the retracted setting, the deformable region 131 can be positioned at any other height relative the peripheral region 132. In the expanded setting, the tactile surface 133 at the deformable region 131 can be elevated above the tactile surface 133 at the peripheral region 132 such that the expanded setting is tactilely distinguishable from the retracted setting at the tactile surface 133. However, the deformable region 131 can be positioned at any other height relative the peripheral region 132 in the expanded setting.

The displacement device 140 can be an electrically-driven positive-displacement pump, such as a rotary, reciprocating, linear, or peristaltic pump powered by an electric motor. Alternatively, the displacement device 140 can be an electroosmotic pump, a magnetorheological pump, a microfluidic pump, a manually-powered pump, such as powered though a manual input provided by the user, or any other suitable device configured to displace fluid through the fluid channel 113 and the fluid conduit 114 to transition the deformable regions between settings, such as described in U.S. Provisional Patent Application No. 61/727,083, file don 15 Nov. 2012, which is incorporated in its entirety by this reference.

As described above and shown in FIG. 8, one variation of the first dynamic tactile interface 100 further includes a touch sensor 170 configured to detect an input at the tactile surface 133. The touch sensor 170 can be a capacitive touch sensor, a resistive touch sensor, an optical touch sensor, a fluid pressure sensor, an acoustic touch sensor, or any other suitable type of sensor. The touch sensor 170 can include a plurality of sensors configured to detect an input at particular regions across the tactile surface 133, including at the deformable region 131. However, the touch sensor 170 can be of any other type, include any other feature or component, and can be patterned across the first dynamic tactile interface 100 in any other way. The touch sensor 170 can be arranged between a display 180 and the substrate 110, as shown in FIG. 8. Alternatively, the display 180 can be a touch display incorporating the touch sensor 170. A portion of the touch sensor 170 can also be coupled to the fluid channel 113, coupled to the fluid conduit 114, or arranged within the substrate 110, such as above or below the fluid channel 113. A portion of the touch sensor 170 can also be arranged within the tactile layer 130. However, all or a portion of the touch sensor 170 can be arranged in any other way within the first dynamic tactile interface 100.

Figure 9:
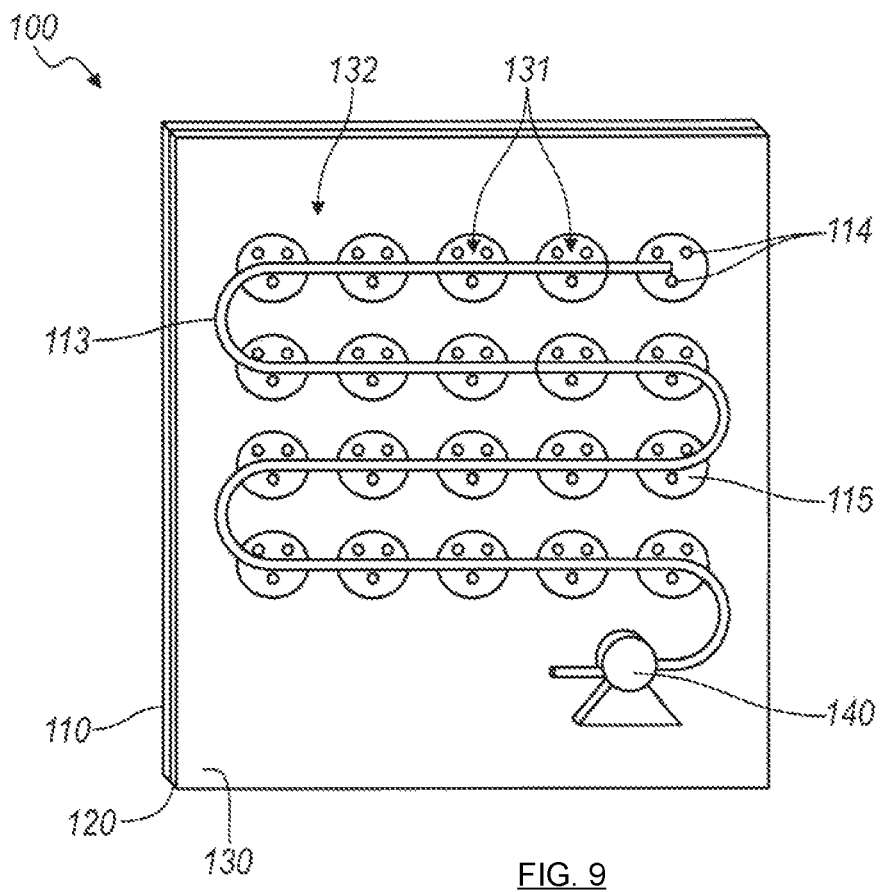
FIG. 9 is a schematic representation of one variation of the first tactile interface.

One variation of the first dynamic tactile interface 100 incorporates a plurality of deformable regions, each paired with a fluid conduit fluidly coupled to at least one fluid channel, as shown in FIG. 9. In this variation, the first dynamic tactile interface 100 can also include one or more displacement devices coupled to the one or more fluid channels, wherein the displacement devices displace fluid through the one or more fluid channels to transition one or more deformable regions between retracted and expanded settings at any given time. In this variation, the deformable regions can define input keys of a QWERTY keyboard when in the expanded setting. Furthermore, the display 180 can output an image aligned with each deformable region, wherein each image is indicative of an input key associated with each deformable region (e.g., SHIFT, 'a,' 'g,' or '8'). In this variation, when the deformable regions are in the expanded setting, a processor coupled to the touch sensor 170 can identify an input on the tactile surface 133 that substantially inwardly deforms a deformable region as an input request for the input key, whereas the processor can identify an input on the tactile surface 133 that does not substantially inwardly deform the deformable region 131 as a second type of input that is not a request for the input key. However, the first dynamic tactile interface 100 can include any other components arranged in any other way to achieve any other function.

In another variation of the first dynamic tactile interface 100, the substrate 110 is physically coextensive with at least one of the display 180 and the touch sensor 170. In this variation, the fluid channel 113 is formed in the interior surface of the tactile layer 130 or is otherwise substantially defined on or within the tactile layer 130. In this variation, the tactile layer 130 is bonded to the substrate 110 at the peripheral region 132, wherein the substrate no rigidly retains the peripheral region 132 during setting transitions of the deformable region 131. However, the first dynamic tactile interface 100 can be of any other form and include any other suitable component, film, or layer.

One variation of the first dynamic tactile interface 100 is incorporated into an electronic device. The electronic device can be any of an automotive console, a desktop computer, a laptop computer, a tablet computer, a television, a radio, a desk phone, a mobile phone, a personal data assistant (PDA), a personal navigation device, a personal media player, a camera, a watch, a gaming controller, a light switch or lighting control box, cooking equipment, or any other suitable electronic device.

9. Second Dynamic Tactile Interface

As shown in FIGS. 23A and 17B, a second dynamic tactile interface 200 includes: a substrate 210 including a first transparent material and defining an attachment surface 216, an open channel 213A opposite the attachment surface 216, and a fluid conduit 214 intersecting the open channel 213A and passing through the attachment surface 216; a tactile layer 230 including a second transparent material and defining a tactile surface 233, a peripheral region 232 bonded to the attachment surface 216 opposite the tactile surface 233, and a deformable region 231 adjacent fluid conduit 214 and disconnected from the attachment surface 216; a closing panel 212 bonded to the substrate 210 opposite the attachment surface 216 and enclosing the open channel 213A to define a fluid channel 213B; a working fluid 250; and a displacement device 240 configured to displace the working fluid 250 into the fluid channel 213B and through fluid conduit 214 to transition the deformable region 231 from a retracted setting to an expanded setting, the deformable region 231 flush with the peripheral region 232 in the retracted setting (shown in FIG. 17A) and offset from the peripheral region 232 in the expanded setting (shown in FIG. 17B).

Figure 18:
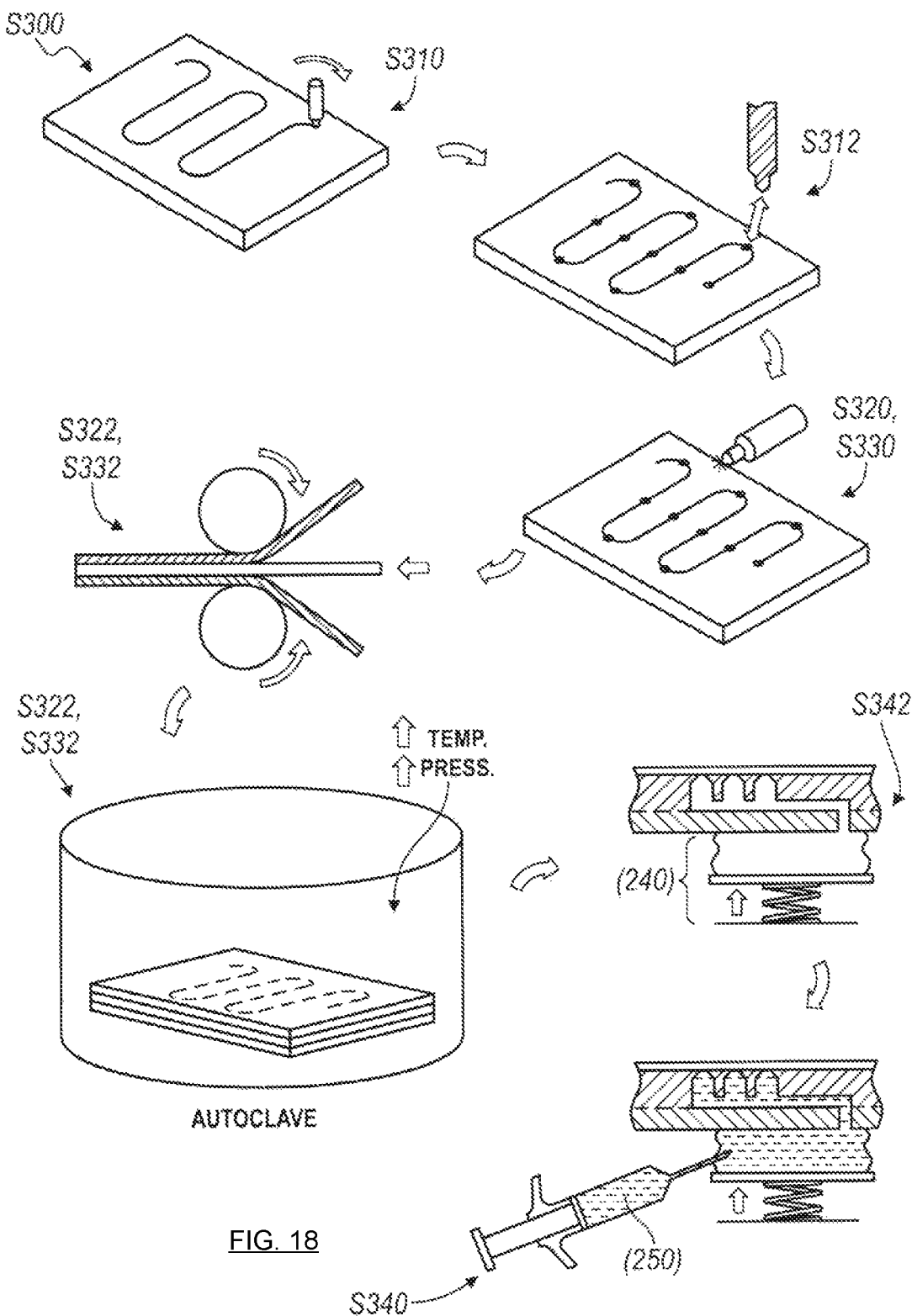
FIG. 18 is a flowchart representation of a third method.

As shown in FIG. 18, a method for manufacturing the second dynamic tactile interface 200 includes: creating an open channel in an interior surface of a substrate including a first transparent material and defining an attachment surface 216 opposite the interior surface in Block S310; creating a fluid conduit intersecting the open channel 213A and passing through the attachment surface 216 of the substrate 210 in Block S312; activating the attachment surface 216 in Block S320; selectively bonding a peripheral region of a tactile layer to the attachment surface 216 in Block S322, the tactile layer 230 including a second transparent material and defining a deformable region disconnected from the attachment surface 216 proximal fluid conduit 214; activating the interior surface in Block S330; bonding a closing panel to the interior surface to enclose a portion of the open channel 213A to define a fluid channel in Block S332; coupling a displacement device to the fluid channel 213B in Block S342; and filling the fluid channel 213B with a working fluid in Block S340.

Like the first dynamic tactile interface, the second dynamic tactile interface 200 functions to expand and retract one or more deformable regions to intermittently and selectively provide tactile guidance over a touchsensor and/or display of a computing device. For example, second dynamic tactile interface 200 can be implemented in a smartphone, tablet, laptop, PDA, automotive or in-dash console, a desktop computer, a television, a radio, a desk phone, a mobile phone, a personal navigation device, a personal media player, a camera, a watch, a gaming controller, a light switch or lighting control box, cooking equipment, or any other suitable computing or electronic device. The second dynamic tactile interface 200 can also be incorporated in an aftermarket device for a computing device, such as described in U.S. patent application Ser. No. 13/465,772, which is incorporated in its entirety by this reference The substrate 210 of the second dynamic tactile interface 200 includes a first transparent material and defines an attachment surface 216, an open channel opposite the attachment surface 216, and a fluid conduit intersecting the open channel 213A and passing through the attachment surface 216. Generally, the substrate 210 functions like the substrate 110 of the first dynamic tactile interface 100 to define an attachment surface 216 that retains a peripheral region of a tactile layer, one or more fluid ports, one or more support members (or support areas) adjacent the fluid ports and deformable regions of the tactile layer 230, and one or more fluid channels that feed fluid into and out of the fluid channels to transition the deformable regions between expanded and retracted settings. The substrate 210 can be substantially transparent and substantially rigid relative to the tactile layer 230 such that changes in fluid pressure within the fluid channel 213B are predominantly absorbed by the deformable region 231 of the tactile layer 230—rather than the substrate 210—thus yielding controlled expansion and retraction of the deformable region 231 of the tactile layer 230.

Figure 19A:
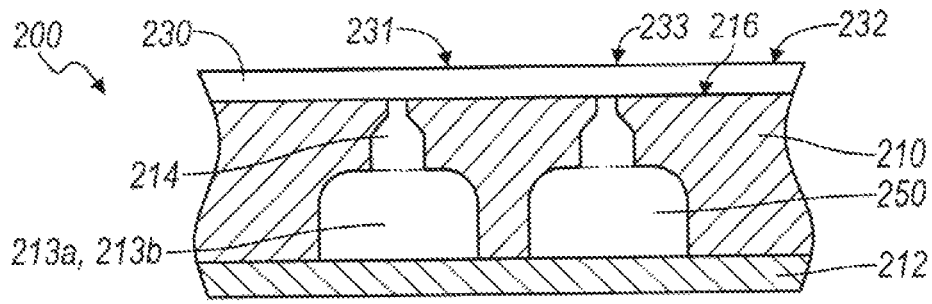
FIGS. 19A and 19B are schematic representations of one variation of the second tactile interface.
Figure 19B:
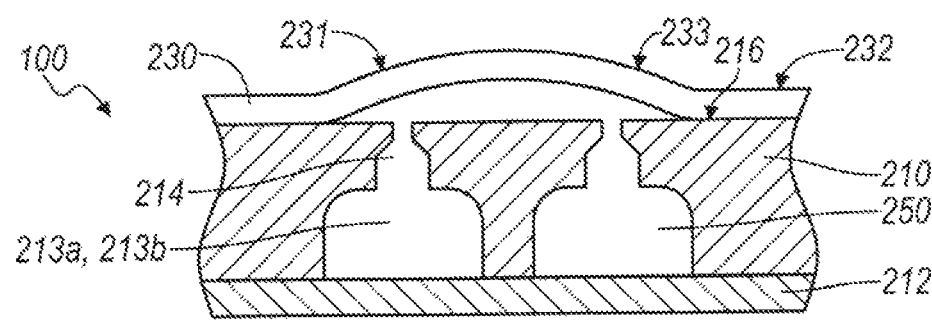

In one implementation, the substrate 210 is a thermoset resin cast in sheet form, such as polycarbonate or a polycarbonate-hybrid polymer. In this implementation, the substrate 210 can begin as a cast polymer sheet of uniform thickness that is post-machined to create the fluid channel 213B and fluid conduit 214. For example, a ball endmill (or endmill of other suitable contour) can be plunged part-way (e.g., through 70% of the thickness of the substrate 210) into the interior surface of the substrate 210 opposite the attachment surface 216. In this example, the ball endmill can then be displaced laterally across the interior surface to cut the open channel 213A of substantially constant depth, as in Block S310 of the method. A tapered endmill ("taper mill") can then be plunged fully through the substrate 210 normal to the interior surface to create one or more frustoconical bores (i.e., fluid conduits) intersecting the open channel 213A, as in Block S312 of the method. The substrate 210 can then be acid-dipped, flame polished, or otherwise processed to reduce or eliminate machining artifacts in the bore(s) and open channel(s). Therefore, in this example, fluid conduit 214 can include a frustoconical section tapering toward the attachment surface 216, and, once the closing panel 212 is bonded to the interior surface of the substrate 210 to enclose the open channel 213A and, thus, define the fluid channel 213B, the fluid channel 213B can define a curvilinear cross-section, as shown in FIGS. 19A and 19B.

Alternatively, the substrate 210 can be acrylic, glass, urethane, polyurethane, or of any other substantially transparent, translucent, and/or relatively rigid material. The open channel 213A and fluid conduit 214 can also be machined (e.g., drilled), stamped, molded, extruded, laser cut, imprinted, or formed in any other way into the substrate 210, such as described above.

The substrate 210 can further define a second open channel opposite the attachment surface 216 and parallel to the fluid channel 213B and a second fluid conduit intersecting the second open channel and passing through the attachment surface 216 adjacent fluid conduit 214 and the deformable region. In this implementation, the substrate 210 can cooperate with the closing panel 212 to enclose the second open channel and, thus, define a second fluid channel, and the second fluid can also be coupled to the displacement device 240 such that the displacement device 240 can displace the working fluid 250 through both the fluid channel 213B and the second fluid channel (and fluid conduit 214 and the second fluid conduit) to transition the deformable region 231 from the retracted setting to the expanded setting. In this implementation, fluid can similarly drain back into fluid conduit 214 and the second fluid conduit and then into the fluid channel 213B and the second fluid channel, respectively, as the deformable region 231 transitions from the expanded setting back into the retracted setting.

The tactile layer 230 of the second dynamic tactile interface 200 includes a second transparent material and defines a tactile surface, a peripheral region bonded to the attachment surface 216 opposite the tactile surface 233, and a deformable region adjacent fluid conduit 214 and disconnected from the attachment surface 216. Generally, the tactile layer 230 functions as an exterior surface of the second dynamic tactile interface 200 (and the computing device) within one or more regions that can be selectively and intermittently deformed to define tactilely-distinguishable formations configured to tactilely guide user input into the computing device. As described above, the tactile layer 230 can be substantially uniform in thickness and composition throughout its thickness and substantially transparent. The tactile layer 230 can also be uniformly elastic and/or flexible relative to the substrate 210 throughout its volume. Alternatively, the tactile layer 230 can be of varying thickness, optical property, or mechanical property throughout its thickness or volume. For example, the tactile layer 230 can feature a well or recess around a perimeter of the deformable region 231 (inside the peripheral region). The tactile layer 230 can be selectively doped across the deformable region 231 to increase elasticity of the deformable region and/or selectively cross-linked to reduce elasticity across the peripheral region.

In one implementation, the substrate 210 is formed of a thermoset polymer material (e.g., a polycarbonate-hybrid polymer) of a first elasticity, and the tactile layer 230 is formed of a urethane material of a second elasticity greater than the first elasticity (of the substrate 210 material). In this implementation, the tactile layer 230 and the substrate 210 can be assembled by first cleaning the substrate 210 (e.g., in ultraviolet ozone) and activating the attachment surface 216 of the substrate 210, as in Block S320 of the third method. For example, the attachment surface 216 can be treated with nitrogen surface activation to create nitrogen groups (e.g., nitrates, nitrites) along the attachment surface 216 and at a skin depth (e.g., ~5 µm) within the substrate 210. The attachment surface 216 can then be masked with an area around the fluid port corresponding to the deformable region 231 exposed and a release compound applied across the mask. Alternatively, the release compound can be printed onto the area around the fluid port corresponding to the deformable region, such as with a two-axis printing head, screen printing, stereo lithography, or other printing technique or apparatus. The release compound can be a mold release wax, water, oil, alcohol, or other suitable material. Yet alternatively, the attachment surface 216 can be selectively activated, including a portion of the attachment surface 216 corresponding to the peripheral region 232 and excluding a portion of the attachment surface 216 corresponding to the deformable region.

In the foregoing implementation, once the attachment surface 216 is activated and/or masked proximal fluid conduit 214 and the tactile layer 230 is cleaned (e.g., in ultraviolet ozone, as described above), the peripheral region 232 of the tactile layer 230 can be selectively bonded to the attachment surface 216 of the substrate 210, as in Block S322 of the third method. For example, the substrate 210 and the tactile layer 230 can be laminated together between a set of rollers, as described above, and then placed in an autoclave for a time, temperature, and pressure specified in curing profile. In this example, the substrate 210 and tactile layer stack can be cured in an elevated temperature (e.g., 400° F.) and/or elevated pressure (e.g., 60 psi) environment within the autoclave for a predefined period of time (e.g., one hour), which can cause a bond to grow across the boundary between the substrate 210 and the tactile layer 230 and can reduce the volume of any gas (e.g., air) trapped between the substrate 210 and the tactile layer 230. The curing process can, thus, yield a stable bond between the substrate 210 and the tactile layer 230 and can reduce optical aberrations between the substrate 210 and the tactile layer 230 caused by trapped gases therebetween. In particular, as the tactile layer 230 and substrate stack cures, polymer chains within the tactile layer 230 can bond to the nitrogen groups along portions of the attachment surface 216 corresponding to the peripheral region, and the release compound (e.g., working fluid) applied to the attachment surface 216 around fluid conduit 214 can locally retard bonding between the tactile layer 230 and the substrate 210 to yield the deformable region 231 adjacent fluid conduit 214 and disconnected from the attachment surface 216.

Figure 20A:
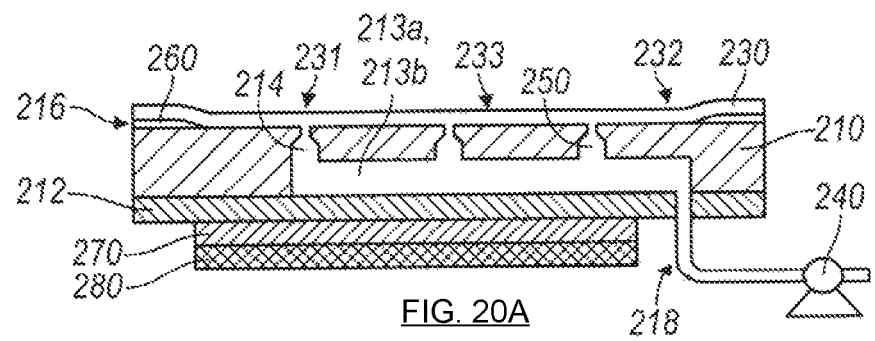
FIGS. 20A and 20B are schematic representations of one variation of the second tactile interface.
Figure 20B:
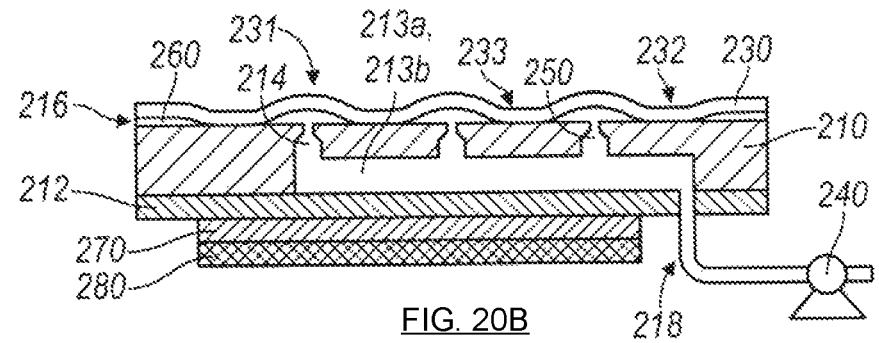

As shown in FIGS. 20A and 20B, one variation of the second dynamic tactile interface 200 includes an opaque bezel 260 arranged about a perimeter of the attachment surface 216 between the substrate 210 and the tactile layer 230. In this variation, the opaque bezel 260 can be substantially opaque and, thus, define an opaque border around the second dynamic tactile interface 200. For example, the opaque bezel 260 can mask (i.e., hide from view) traces and a ribbon connector for a touch sensor coupled to the closing panel 212 opposite the substrate 210. The opaque bezel 260 can also mask a via 218 in the closing panel 212 (shown in FIG. 20A) that feeds fluid from the displacement device 240 into the fluid channel 213B, as described below. The opaque bezel 260 can be applied along the entire perimeter of the attachment surface 216 or along one or a subset of edges of the attachment surface 216. The opaque bezel 260 can also be of similar or dissimilar width from each edge of the attachment surface 216. For example, for the second dynamic tactile interface 200 implemented within a smartphone, the opaque bezel 260 can be 0.20" wide along the vertical edges of the attachment surface 216 and 0.80" wide along the horizontal edges of the attachment surface 216.

Figure 21:
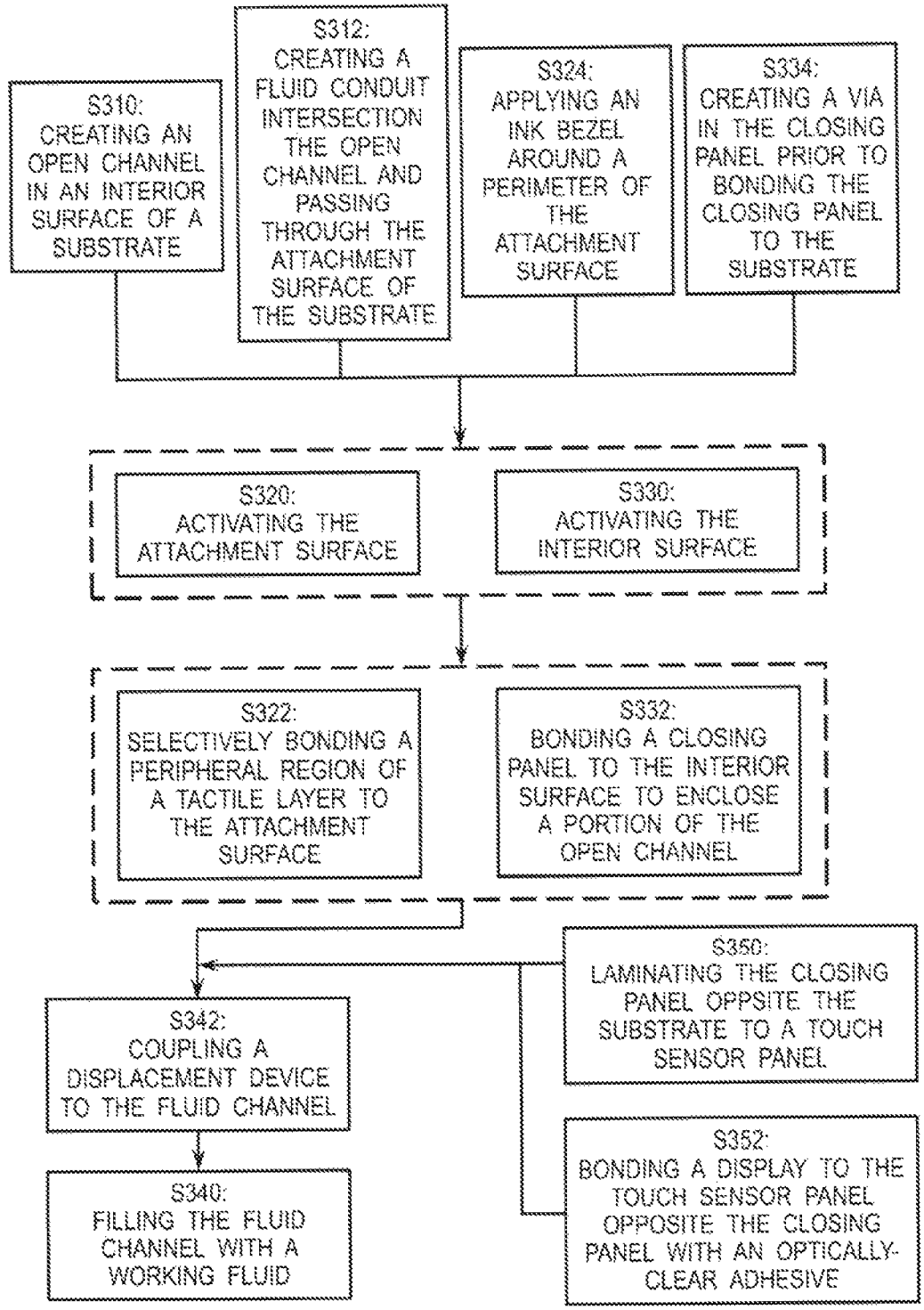
FIG. 21 is a flowchart representation of one variation of the third method.

One variation of the third method can therefore include applying an opaque bezel around a perimeter of the attachment surface 216 in Block S324, as shown in FIG. 21. In the foregoing implementation, the opaque bezel 260 can be applied to the attachment surface 216 prior to assembly of the tactile layer 230 over the substrate 210 such that the substrate 210 and the tactile layer 230 cooperate to substantially enclose the opaque bezel 260. For example, once the substrate 210 is cleaned and the attachment surface 216 activated, a black ink in an alcohol or epoxy suspension can be printed or rolled onto the attachment surface 216 in a substantially uniform thickness to yield suitably minimal local light transmission. The tactile layer 230 can then be laminated over the ink and the attachment surface 216 and cured, as described above. In this implementation, which the tactile layer 230, substrate, and opaque bezel stack cures, the opaque bezel 260 can flow or deform at its interior edge proximal the junction between the tactile layer 230, substrate, and opaque bezel (e.g., due to elevated temperature in the autoclave) to form a smooth transition between the tactile layer 230, substrate, and opaque bezel, as shown in FIGS. 20A and 20B.

Alternatively, the opaque bezel 260 in the form of an uncured black epoxy sheet or a black urethane sheet can be trimmed to size and applied over the attachment surface 216, applied to the interior surface of the tactile layer 230, or inserted between the substrate 210 and the tactile layer 230 prior to bonding. Yet alternatively, the opaque bezel 260 can be applied to or inserted between the interior surface of the substrate 210 and the closing panel 212 with similar techniques or methods.

Figure 23B:
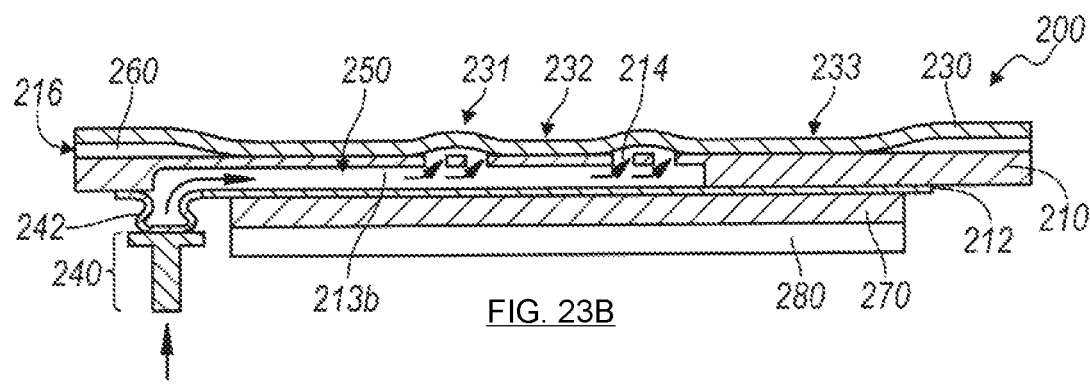

In this variation, the displacement device 240 can include a bladder 242 (e.g., similar to the membrane described below) that is bonded to the substrate over an inlet of the fluid channel 213B and that contains a volume of the working fluid 250, as shown in FIGS. 23A and 23B. For example, the fluid channel 213B can define an inlet terminating in a region of the substrate 210 under the opaque bezel 260 not covered by the closing panel 212, and an injection molded, blow molded, or vacuum formed urethane sheet defining a pocket can be bonded directly to the back surface of the substrate over the open channel, thereby closing the pocket to the inlet of the fluid channel 213B to define the bladder 242 'suspended' from the substrate 210. Thus, with the pocket and the fluid channel 213B filled with the working fluid, an actuator within the displacement device can compress the bladder 242 laterally (e.g., parallel to the broad face of the tactile layer) or inward toward the substrate, thereby displacing working fluid out of the bladder 242 and into the fluid channel 213B to expanded one or more deformable regions fluidly coupled to the fluid channel 213B, as shown in FIG. 23B. In this implementation, the bladder 242 can be bonded directly to the substrate, such as with an optically-clear adhesive or by fusing the bladder 242 to the substrate 210 with a heated die. Alternatively, closing panel 212 can be bonded across the substrate 210 and define a via 218 intersecting the fluid channel 213B—as described below—and arranged under the opaque bezel 260, and the bladder 242 can be bonded to the closing panel over the via 218 and under the opaque bezel 260. Therefore, in this implementation, the substrate 210, the closing panel 212, and the bladder 242 can cooperate to form a closed fluid system, and the opaque bezel 260 can obscure the bladder 242, the via 218, an actuator of the displacement device 240, and/or other features optically-discernible features of the second dynamic tactile interface 200. However, the bladder 242 can be of any other elastic or elastomeric material and can be fluidly coupled to the fluid channel 213B in any other suitable way.

The closing panel 212 of the second dynamic tactile interface 200 is bonded to the substrate 210 opposite the attachment surface 216 and encloses the open channel 213A to define a fluid channel. The closing panel 212 can be of a material similar to that of the tactile layer 230 such that the closing panel 212 can be bonded to the substrate 210 with a technique or method similar to that described above to bond the tactile layer 230 to the substrate 210. For example, both the closing panel 212 and the tactile layer 230 can be of urethane, but the tactile layer 230 can be a urethane material of a higher elasticity (e.g., lower durometer or Shore hardness) than the urethane material of the closing panel 212 such that the tactile layer 230 is more prone to deformable at the deformable region 231 than the closing panel 212 proximal the open channel 213A when fluid pressure within the fluid channel 213B changes. The closing panel 212 can also be of a uniform thickness similar to that of the tactile layer 230. Alternatively, the closing panel 212 can be substantially thick (i.e., thicker than the tactile layer 230) to resist outward deformation proximal the open channel 213A when fluid pressure within the fluid channel 213B increases. For example, the closing panel 212 can include a sheet of PMMA of a thickness substantially similar to a thickness of the substrate 210 and can be bonded to the substrate 210 as described above to yield addition resistance to deflection of the substrate 210 as fluid in pumped into and out of the fluid channel 213B. Yet alternatively, the closing panel 212 can be substantially thin (i.e., thinner than the tactile layer 230) to function as an interface layer to close the open channel 213A and to bond the interior surface of the substrate 210 to a more rigid panel, such as to a capacitive touch panel with a PMMA substrate or to a display with a glass substrate that support the closing panel 212 against deformation when the fluid pressure within the fluid channel 213B changes. Furthermore, like the tactile layer 230 and the substrate 210, the closing panel 212 can be substantially transparent to enable light transmission therethrough, such as from a display coupled to the second dynamic tactile interface 200 as described above.

The closing panel can also include multiple sublayers. For example, the closing panel 212 can also include a urethane sublayer and a coating of a hard material (i.e., a "hardcoat") arranged over the urethane layer and bonded to the substrate 210. (The tactile 230 can include a similar "hardcoat" opposite the substrate 210, such as to improve wear resistance, reduce haze, reduce glare, etc. at the tactile layer 230.) In another example, the closing panel 212 can also include a urethane sublayer and a barrier sublayer (e.g., a sheet of polyester) bonded to the urethane sublayer opposite the substrate 210. In this example, the barrier sublayer can be substantially impermeable to the working fluid, thereby retarding diffusion of working material from the substrate into an adjacent touch sensor 270, display 280, or self-wetting adhesive film 290.

In the implementation described above in which the substrate 210 is formed of a polycarbonate-hybrid material and the tactile layer 230 is formed of a urethane material of an elasticity greater than that of the substrate 210, the closing panel 212 can be formed of a urethane material similar to that of the tactile layer 230 but of an elasticity less than that of the tactile layer 230. In this implementation, the closing panel 212 can be bonded to the substrate 210 with a techniques or methods similar to those described above to bond the tactile layer 230 to the substrate 210. In particular, the interior surface of the substrate 210 can be cleaned and then activated, as in Block S330 of the third method. For example, the interior surface can be cleaned in ultraviolet ozone and then treated with nitrogen surface activation as described above. As in Block S332 of the third method, the closing panel 212 can be similarly cleaned and then laminated to the interior surface of the substrate 210, such as described above, to enclose a portion of the open channel 213A, thereby defining the fluid channel 213B. The substrate 210 and the closing panel 212 can then be cured, such as according to a cure schedule similar to that described above.

In the foregoing implementation, the interior surface and the attachment surface 216 of the substrate 210 can be prepared for bonding with the tactile layer 230 and the closing panel 212 substantially simultaneously. For example, the interior surface can be cleaned, then the substrate 210 flipped and the attachment surface 216 cleaned. The interior surface can subsequently be activated, then the substrate 210 flipped and the attachment surface 216 activated. The substrate 210 can then be placed between both the tactile layer 230 and the closing panel 212 and the stack laminated (e.g., through a set of rollers) prior to placement in an autoclave for curing. Alternatively, the substrate 210 and the tactile layer 230 can be bonded and cured, and then the substrate 210—tactile layer stack bonded to the closing panel 212 and cured, or vice versa. However, the tactile layer 230, substrate, and closing panel (and opaque bezel) can be prepped and bonded—and the corresponding Blocks of the third method can be performed—in any other suitable order.

In one implementation, the closing panel 212 includes a via configured to communicate fluid between the displacement device 240 and the fluid channel 213B. In the variation of the second dynamic tactile interface 200 that includes the opaque bezel 260 between the substrate 210 and the tactile layer 230, the closing panel 212 can define the via 218 behind the opaque bezel 260 such that the via 218 is not optically visible through the tactile layer 230. In this implementation, the via 218 can be created in the closing panel 212 prior to bonding the closing panel 212 to the substrate 210, as in Block S334 of the third method shown in FIG. 21. For example, the via 218 can be stamped, machined, drilled, etched (e.g., bulk micro-machined), laser cut, or otherwise formed in the closing panel 212, and the closing panel 212 can then be acid washed, flame polished, or otherwise processed to reduce or eliminates manufacturing artifacts leftover from creation of the via 218. The closing panel 212 can then be aligned with and bonded to the interior surface of the substrate 210 with the via 218 adjacent the open channel 213A (i.e., the fluid channel 213B) such that working fluid can be communicated through the via 218 and into the fluid channel 213B. Alternatively, the via 218 can be created in the closing panel 212 after the closing panel 212 is bonded to the substrate 210.

The second dynamic tactile interface 200 also includes a working fluid. Generally, the displacement device 240 functions to displace the working fluid 250 into the fluid channel 213B, thereby increasing fluid pressure within the fluid channel 213B and fluid conduit 214 and, thus, causing the deformable region 231 of the tactile layer 230 to expand outwardly. The displacement device 240 can also release fluid pressure within the fluid channel 213B and/or actively pump fluid out of the fluid channel 213B to enable the deformable region 231 to retract, as described above.

The working fluid 250 can be substantially transparent, such as exhibiting a refractive index, Abbe number, and/or chromatic dispersion properties similar to those of the substrate 210 in order to limit diffraction, refraction, and reflection of light within the second dynamic tactile interface 200 at interfaces between the working fluid 250 and the substrate 210 (e.g., at a surface of the fluid channel 213B or at a surface of fluid conduit 214). For example, the working fluid 250 can be water, an alcohol, or an oil.

Figure 22A:
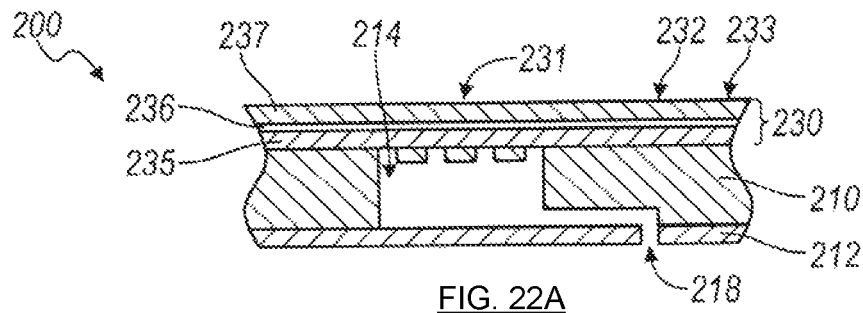
FIGS. 22A and 22B are schematic representations of one variation of the second tactile interface.
Figure 22B:
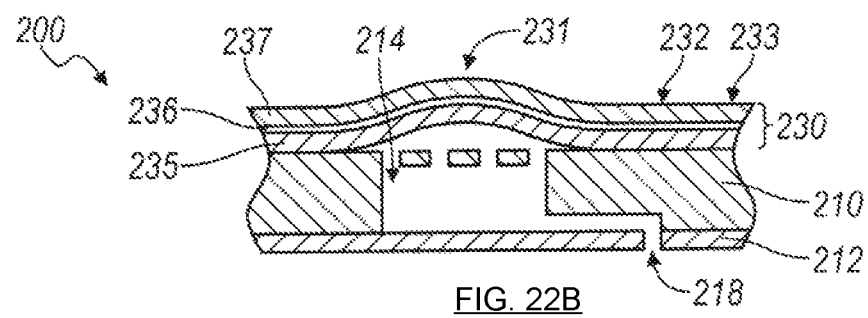

In one implementation, the working fluid 250 is a silicone oil that is substantially incompressible and exhibits low vapor pressure. In this implementation, the base material of the tactile layer 230 can tend to adsorb or "uptake" the working fluid 250, and the tactile layer 230 can, thus, incorporate a barrier sublayer 236 that is impermeable to the working fluid 250 to limit working fluid uptake into the tactile layer 230. For example, the tactile layer 230 can include a first sublayer 235 (bonded to the substrate 210), a barrier sublayer 236 bonded to the first sublayer 235, and a second sublayer 237 bonded to the barrier sublayer 236 opposite the first sublayer 235, as shown in FIGS. 22A and 22B. In this example, the first and second sublayer 237s can be of the same or similar urethane material, and the barrier sublayer 236 can be nylon, (high-density) polyethylene, or any other suitable plastic that is substantially impermeable to silicone oil. Furthermore, in this example, the barrier sublayer 236 can be substantially thin to enable light transmission through the tactile layer 230 with minimal internal reflection, refraction, or diffraction, and the first sublayer 235 can be substantially thin to minimize a volume of the material over the deformable region 231 that can adsorb the working fluid 250, as shown in FIG. 22B. The second sublayer 237 can, thus, be substantially thicker than the barrier sublayer 236 and/or the first sublayer 235 to yield suitable strength, elasticity, abrasion resistance, etc. to the tactile layer 230 and the tactile surface 233.

In the foregoing implementation, the second sublayer 237 can alternatively be of a polymer material different from that of the first sublayer 235. For example, the first sublayer 235 can be of urethane of a first elasticity, and the second sublayer 237 can be of a polycarbonate-based material of a second elasticity less than the first elasticity. In this example, the first sublayer 235 can, thus, function as a buffer backing that absorbs sharp deformation of the tactile layer 230 proximal a perimeter of the deformable region, such as described above, and the second layer can yield improved abrasion resistance, gloss or sheen, tactile smoothness, etc. However, the working fluid 250 can be of any other liquid (or gas), and the tactile layer 230 can be of any other number of sublayers of any other material and geometry to limit uptake of working fluid into the tactile layer 230. However, the tactile layer 230 can be of any other form, any other material, and bonded to the substrate 210 within any other technique or method. The closing panel 212 and the substrate 210 can similarly be of any other suitable material can assembled within the second dynamic tactile interface 200 in any other suitable way.

The third method can therefore include Block S340, which recites filling the fluid channel 213B with a working fluid in Block S340. In one implementation, the closing panel 212 includes a draw port coupled to the fluid channel 213B at one end of the fluid channel 213B opposite the via 218. In this implementation, once the substrate 210, closing panel, tactile layer, and displacement device are assembled, a valve is connected between an inlet of the displacement device 240 (or connected reservoir) and an external reservoir containing working fluid. With the valve closed, gas (e.g., air) is then evacuated from the fluid channel 213B through the draw port. Once a threshold vacuum in reached within the fluid channel 213B, the valve is opened and working fluid is drawn from the external reservoir into the displacement device 240, through the via 218, and into the fluid channel 213B and fluid conduit. Any remaining gas within the second dynamic tactile interface 200 can be subsequently purged by supporting the second dynamic tactile interface 200 vertically with the draw port above the via 218 and displacing a small volume of working fluid into and out of the second dynamic tactile interface 200 to dislodge and draw remaining (air) bubbles out of the second dynamic tactile interface 200 through the draw port. The draw port is finally disconnected from the valve and sealed, and the displacement device 240 (or connected reservoir) is similarly sealed, thus isolating the working fluid 250 in the second dynamic tactile interface 200. However, Block S340 can function in any other way to evacuate gas from the fluid channel 213B, to inject working fluid into the second dynamic tactile interface 200, and/or to purge any remaining gas from the second dynamic tactile interface 200.

As shown in FIGS. 20A and 20B, one variation of the second dynamic tactile interface 200 includes a touch sensor 270 configured to output a signal corresponding to an input on the tactile surface 233. As described above, the touch sensor 270 can be a capacitive touch sensor, a resistive touch sensor, or any other suitable type of sensor arranged on or across a sensor panel.

In one implementation, the assembled substrate, closing panel, and substrate—hereinafter the "stack"—is bonded to the sensor panel. The third method can therefore include Block S350, which recites laminating the closing panel 212 opposite the substrate 210 to a touch sensor panel and curing the closing panel 212 and the touch sensor 270 panel under elevated pressure and elevated temperature, as shown in FIG. 21. In one example, the sensor panel includes a polymer sheet (e.g., a PMMA or glass sheet) patterned on each side with indium tin oxide (ITO) traces to form a capacitive touch sensor. In this example, an optically-clear adhesive (OCA) can be sprayed or rolled across the closing panel 212 opposite the substrate 210 and/or across a broad face of the sensor panel (and over the ITO traces), and the sensor panel and the stack can be laminated together. Alternatively, a sheet of uncured OCA can be inserted between the stack and the sensor panel. The stack, OCA, and sensor panel can then be cured, such as in an autoclave at a predefined temperature and pressure for a predefined period of time, to adhere the sensor panel to the stack. In this example, the peak temperate of the autoclave during the curing process can be kept substantially below a flow temperature, evaporation temperature, oxidation temperature, etc. of the ITO or other trace, feature, or material within the sensor panel to substantially eliminate potential for damage to the sensor panel during the assembly process. In particular, the substrate 210, the tactile layer 230, and the closing panel 212 can be assembled into the stack and cured before the sensor panel in bonded to the stack.

Alternatively, the closing panel 212 and the sensor panel can be physically coextensive, wherein the sensor panel is bonded directly to the substrate 210. For example, the touch panel can include a series of ITO traces patterned across each side of a urethane sheet, which is laminated to the substrate 210 and tactile layer assembly and cured in an autoclave at a peak temperate that does not yield substantially distortion or damage to the ITO traces, such as described above. Alternatively, barrier layer can be bonded between the sensor panel and the substrate 210 to prevent diffusion of the working material from the substrate 210 into the sensor panel. However, the second dynamic tactile interface 200 can include a touch sensor of any other type and can be bonded or coupled to the closing panel 212 and/or substrate in any other suitable way.

As shown in FIG. 21, one variation of the second dynamic tactile interface 200 includes a display 280 bonded to the closing panel 212 opposite the tactile layer 230 with an optically-clear adhesive. Generally, the display 280 is configured to render an image of an input key proximal the deformable region, as described above. In one implementation, the display 280 is bonded directly to closing panel, such as by sandwiching a sheet of OCA between the stack and the display 280 and curing the OCA, as described above. One variation of the third method can therefore include Block S352, which recites bonding a display to the touch sensor 270 panel opposite the closing panel 212 with an optically-clear adhesive. In this implementation, the display 280 can be a touchscreen that incorporates both a display and a (touch) sensor. Alternatively, in the variation of the second dynamic tactile interface 200 in which a touch sensor is bonded the closing panel 212. The display 280 can be bonded to the touch sensor 270 opposite the closing panel 212, such as by adhering the display 280 to the sensor panel with an OCA. In this implementation, the display 280 can be bonded to the sensor panel after or while the sensor is bonded to the stack. Alternatively, the display 280 and the sensor panel can be assembled and subsequently bonded to the stack, such as described above. However, the second mobile computing device can include any other type of display and/or touch sensor coupled or bonded to the substrate 210, tactile layer, and/or closing panel in any other suitable way.

Yet alternatively, the second dynamic tactile interface 200 can further include a self-wetting adhesive film arranged across the closing panel 212 opposite the substrate 210 and configured to transiently bond the "stack" to a touchscreen panel. In one example of this variation, the second dynamic tactile interface 200 functions as an aftermarket dynamic touch panel that can be applied to an existing mobile computing device or device include other touch-sensitive display panel to provide intermittent tactile guidance to a user interfacing with the device, and the self-wetting adhesive film can function to adhere the stack to the device. In one example, the self-wetting adhesive film includes a pressure-sensitive adhesive such that a user may lay the second dynamic tactile interface 200 over a touchscreen of an appropriately-sized device and then press the second dynamic tactile interface 200 to the touchscreen to bond the pressure-sensitive adhesive onto the device, the thereby retrofitting the device with dynamic tactile functionality as described herein. The user may later peel the second dynamic tactile interface 200 from the device, such as to replace the second dynamic tactile interface 200 with a new or upgraded unit or to return the device to a stock configuration. However, the self-wetting adhesive film can be of any other material and can function in any other way to transiently bond the second dynamic tactile interface 200 to a touchscreen panel.

The displacement device 240 of the second dynamic tactile interface 200 is configured to displace the working fluid 250 into the fluid channel 213B and through fluid conduit 214 to transition the deformable region 231 from a retracted setting to an expanded setting. As described above, the displacement device 240 generally functions to pump fluid into the fluid channel 213B transition the deformable region 231 from flush with the peripheral region 232 in the retracted setting and to offset from the peripheral region 232 in the expanded setting. In one implementation, the displacement device 240 is coupled to the via 218 in the closing panel 212, as described above. The third method can therefore include Block S342, which recites coupling the displacement device 240 to the via 218. For example, the displacement device 240 can include a positive displacement pump coupled to the via 218 by a flexible hose extending from the via 218.

Alternatively, the displacement device 240 can include a flexible membrane bonded to the closing panel 212 around the via 218 and opposite the substrate 210 to define a reservoir filled with the working fluid 250. In this implementation, the displacement device 240 can compress the flexible membrane to displace fluid through the via 218 and into the fluid channel 213B to transition the deformable region 231 into the expanded setting. However, the displacement device 240 can be of any other form and can be fluidly coupled to the fluid channel 213B in any other suitable way. The displacement device 240 can also transition the deformable region 231 of the tactile layer 230 to any other position above or below the peripheral region 232 of tactile layer.

However, the second dynamic tactile interface 200 can include any number of displacement devices and can define any number of vias, fluid channels, fluid conduits, valves, and/or deformable regions that can be selectively and intermittently transitioned between retracted and expanded settings to provide tactile guidance over any other suitable computing device. Similarly, the third method can implement any other method or technique to manufacture and assemble the second dynamic tactile interface 200.

The systems and methods described herein can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

We claim:
1. A tactile interface comprising:
 a flexible substrate configured to deform to a first offset in response to application of a deflecting force on the flexible substrate;
 a tactile layer defining a tactile surface and configured to deform to a second offset in response to application of the deflecting force on the tactile surface;
 a tie layer:
  configured to retain the tactile layer against the flexible substrate;
  comprising a flexible polymer layer thermally laminated onto the flexible substrate with an optically-clear adhesive; and
  defining a first surface contacting the flexible substrate and a second surface contacting the tactile layer, the first surface of the tie layer configured to stretch by the first offset to maintain contact with the flexible substrate and the second surface of the tie layer configured to stretch by the second offset to maintain contact with the tactile layer; and
 an ink layer printed on a surface of the flexible polymer layer opposite the optically-clear adhesive, ink of the ink layer coincident the non-planar edge of the tactile layer and configured to obscure light transmitted across the tie layer.
2. The tactile interface of claim 1:
 wherein the flexible substrate comprises a flexible display configured to output a visual graphical image;
 wherein the tie layer comprises an optically clear polymer layer configured to transmit light from the flexible display to the tactile layer; and
 wherein the tactile layer comprises an optically clear layer configured to transmit light from the flexible display.
3. The tactile interface of claim 2, wherein the tie layer is configured to retain optical clarity over a threshold number of deformations defined by chemical and physical cross-linking of polymers within the tie layer and adhesion to the tactile interface and flexible substrate.
4. The tactile interface of claim 1, further comprising a touch sensor over the flexible substrate, the touch sensor configured to detect input applied to the tactile surface.
5. The tactile interface of claim 1, wherein the tie layer is configured to:
 deform at first rate proportional to a first elasticity of the tie layer in response to application of a deflecting force; and
 relax to a pre-deformation state in response to release of the deflecting force.
6. The tactile interface of claim 1:
 further comprising a hard layer arranged over the tactile layer opposite the flexible substrate; and
 wherein the tie layer comprises a compressible material and is configured to dampen transmission of impact to the flexible substrate in response to application of force to the tactile surface.
7. The tactile interface of claim 1, wherein the tie layer is cast onto the flexible substrate by:
 combining a first prepolymer, a first solvent, and a first curing agent to define a first viscous material;

depositing the first viscous material onto the flexible substrate, the first viscous material flowing across the flexible substrate to form the tie layer of substantially uniform thickness; and heating the tie layer to drive off the solvent and induce reaction between the first curing agent and the prepolymer to form the tie layer defined by physically and chemically cross-linked polymer chains.

8. The tactile interface of claim 1, further comprising a thermoplastic polyurethane coating deposited onto the tie layer.

9. The tactile interface of claim 1:
wherein the tactile layer comprises a deformable portion; and
wherein the flexible substrate comprises a particular portion, defining a first fluid vessel, and coupled to the tactile layer at an attachment surface opposite the tactile surface, the deformable portion of the tactile layer and the flexible substrate cooperating to define a first cavity at a first depth from the surface and fluidly coupled to the first fluid vessel; and
further comprising:
a second substrate coupled to the first substrate and defining a second fluid vessel, the first substrate and the second substrate cooperating with the particular portion of the first substrate to define a second cavity at a second depth from the surface and fluidly coupled to the second fluid vessel; and
a displacement device fluidly coupled to the first fluid vessel and the second fluid vessel, selectively manipulating fluid in the first fluid vessel into the first cavity to transition the deformable portion of the layer from a retracted setting to an expanded setting tactilely distinguishable from the surface, and selectively manipulating fluid in the second fluid vessel into the second cavity to deform the particular portion and the deformable portion from the retracted setting to a second expanded setting.

10. A tactile interface comprising:
a substrate;
a first tie layer arranged over the substrate and configured to adhere to the substrate;
a tactile layer defining a tactile surface comprising a planar portion and a non-planar portion proximal an edge of the tactile layer, the first tie layer configured to adhere the tactile layer to the substrate across the planar portion and proximal the non-planar edge; and
an ink layer printed on a surface of the first tie layer opposite the tactile layer, ink of the ink layer coincident the non-planar edge of the tactile layer and configured to obscure light transmitted across the tie layer.

11. The tactile interface of claim 10:
wherein the non-planar portion of the tactile surface comprises a rounded edge; and
wherein the first tie layer is configured to stretch to conform to the rounded edge of the tactile layer.

12. The tactile interface of claim 10:
wherein the first tie layer comprises:
a rigid thermoplastic polymer layer; and
optically-clear adhesive applied to a first surface of the first tie layer adjacent the tactile layer; and
wherein the ink layer is printed on a second surface of the rigid thermoplastic polymer layer opposite the optically-clear adhesive.

13. The tactile interface of claim 10:
further comprising a display configured to output a visual graphical image arranged under the substrate;
wherein the tactile layer comprises an optically clear layer configured to transmit light from the flexible display across the planar portion of the tactile surface; and
wherein the first tie layer comprises an optically clear polymer layer configured to transmit light from the flexible display to the tactile layer.

14. The tactile interface of claim 10, wherein the first tie layer is cast onto the substrate by:
combining a first prepolymer, a first solvent, and a first curing agent to define a first viscous material;
depositing the first viscous material onto the substrate, the first viscous material flowing across the substrate to form the first tie layer of substantially uniform thickness; and
heating the first tie layer to drive off the solvent and induce reaction between the first curing agent and the prepolymer to form the first tie layer defined by physically and chemically cross-linked polymer chains.

15. The tactile interface of claim 10:
wherein the substrate comprises a polarizer;
wherein the first tie layer is cast directly on first surface of the polarizer; and
further comprising:
a display; and
a second tie layer cast directly on a second surface of the polarizer opposite the first surface, the second tie layer configured to bond the polarizer to the display.

16. The tactile interface of claim 10:
wherein the substrate is configured to deform to a first offset in response to application of a deflecting force on the substrate;
wherein the tactile layer is configured to deform to a second offset in response to application of the deflecting force on the tactile surface; and
wherein the first tie layer defines a first surface contacting the substrate and a second surface contacting the tactile layer, the first surface of the first tie layer configured to stretch by the first offset to maintain contact with the substrate and the second surface of the first tie layer configured to stretch by the second offset to maintain contact with the tactile layer.

17. The tactile interface of claim 16, wherein the first tie layer is configured to retain optical clarity over a threshold number of deformations defined by chemical and physical cross-linking of polymers within the first tie layer.

18. The tactile interface of claim 16, wherein the tactile layer exhibits a second relaxation time within a threshold offset from a first relaxation time of the tie layer, the tactile layer cooperating with the tie layer to recover the tactile surface to a pre-deformation state within a period defined by a slower of the first relaxation time and the second relaxation time in response to deformation of the tactile surface.

* * * * *